United States Patent
Zhao

(10) Patent No.: US 9,435,954 B2
(45) Date of Patent: Sep. 6, 2016

(54) FULLY AUTOMATED OPTICAL FIBER CUTTER

(71) Applicants: DH INFOTECH (WEIHAI) INC., Shandong (CN); INNO INSTRUMENT, INC., Gyeonggi-do (KR)

(72) Inventor: Yangri Zhao, Shandong (CN)

(73) Assignees: INNO Instrument .Inc, Incheon (KR); INNO Instrument(China) .Inc, WeiHai (CN)

(*) Notice: Subject to any disclaimer, the term of this patent is extended or adjusted under 35 U.S.C. 154(b) by 259 days.

(21) Appl. No.: 14/124,497

(22) PCT Filed: Oct. 29, 2012

(86) PCT No.: PCT/CN2012/083705
§ 371 (c)(1),
(2) Date: Dec. 6, 2013

(87) PCT Pub. No.: WO2014/059697
PCT Pub. Date: Apr. 24, 2014

(65) Prior Publication Data
US 2015/0128779 A1    May 14, 2015

(30) Foreign Application Priority Data

Oct. 18, 2012 (CN) .......................... 2012 1 0398943
Oct. 18, 2012 (CN) .......................... 2012 2 0536143
Oct. 18, 2012 (CN) .......................... 2012 2 0536144

(51) Int. Cl.
*B26D 3/08* (2006.01)
*G02B 6/25* (2006.01)
(Continued)

(52) U.S. Cl.
CPC ................. *G02B 6/25* (2013.01); *B26D 1/151* (2013.01); *B26D 5/08* (2013.01); *B26D 7/02* (2013.01);
(Continued)

(58) Field of Classification Search
USPC ......... 83/451, 887, 584, 588, 856, 587, 601, 83/613, 614, 697, 699.3, 944, 471, 471.3; 225/2, 96.5, 105, 96.005, 96, 97, 4, 225/103; 30/357
See application file for complete search history.

(56) References Cited

U.S. PATENT DOCUMENTS 5,024,363 A * 6/1991 Suda .......................... G02B 6/25
                                                         225/2
9,229,166 B2 * 1/2016 Hasegawa ................ G02B 6/25
(Continued)

FOREIGN PATENT DOCUMENTS

CN          2485107 Y    4/2002
CN          1678420 A   10/2005
(Continued)

OTHER PUBLICATIONS

Partial English translation of a Search Report dated Dec. 9, 2013, issued by the State Intellectual Property Office of the People's Republic of China in corresponding Chinese Patent Application No. CN-2012103989435 (2 pages).
(Continued)

*Primary Examiner* — Ghassem Alie
(74) *Attorney, Agent, or Firm* — Osha Liang LLP

(57) ABSTRACT

A fully automated optical fiber cutter includes a fiber cutter body and a fiber clamp. The fiber cutter body includes a cutter cover body and a cutter main body, which are pivotally connected. Inside the cutter main body is provided with a movable blade-fixation seat, which comprises a blade for fiber cutting. The fiber clamp is installed on the cutter main body. The fiber clamp includes a clamp main body and a clamp cover body, which are pivotally connected. The cutter cover body, the clamp cover body and the blade-fixation seat are linked by a linkage component. When in use, the cutter cover body is pressed to drive the clamp cover body close and push the blade-fixation seat to move, thereby the blade is aligned to cut the fiber.

30 Claims, 21 Drawing Sheets

(51) Int. Cl.
  *B26D 7/26* (2006.01)
  *B26D 5/08* (2006.01)
  *B26D 7/02* (2006.01)
  *B26D 1/15* (2006.01)

(52) U.S. Cl.
  CPC ........... *B26D 7/2628* (2013.01); *B26D 7/2635* (2013.01); *Y10T 83/2029* (2015.04); *Y10T 83/5669* (2015.04); *Y10T 83/5787* (2015.04)

(56) References Cited

U.S. PATENT DOCUMENTS

| | | | | |
|---|---|---|---|---|
| 2008/0282522 A1* | 11/2008 | Song | ...................... | G02B 6/245 29/33.52 |
| 2010/0183273 A1* | 7/2010 | Heidler | ................... | G02B 6/25 385/134 |
| 2010/0187276 A1* | 7/2010 | Ohmura | ................... | G02B 6/25 225/2 |
| 2014/0000434 A1* | 1/2014 | Hasegawa | ................ | G02B 6/25 83/887 |

FOREIGN PATENT DOCUMENTS

| | | |
|---|---|---|
| CN | 1764853 A | 4/2006 |
| CN | 200982518 Y | 11/2007 |
| CN | 101573215 A | 11/2009 |
| CN | 101943769 A | 1/2011 |
| CN | 101975977 A | 2/2011 |
| JP | 2005-173130 A | 6/2005 |
| JP | 2005-258129 A | 9/2005 |

OTHER PUBLICATIONS

Partial English translation of a Search Report dated May 27, 2014, issued by the State Intellectual Property Office of the People's Republic of China in corresponding Chinese Patent Application No. CN-2012103989435 (2 pages).

International Search Report for corresponding International Application No. PCT/CN2012/083705, mailed Aug. 1, 2013 (5 pages).

Written Opinion for corresponding International Application No. PCT/CN2012/083705, mailed Aug. 1, 2013 (7 pages).

\* cited by examiner

FULLY AUTOMATED OPTICAL FIBER CUTTER

CROSS-REFERENCE TO RELATED APPLICATIONS

This is a national stage application based on PCT/CN2012/083705, filed on Oct. 29, 2012, which claims the priorities of Chinese Application No. 201220536143.0, filed on Oct. 18, 2012, Chinese Application No. 201220536144.5, filed on Oct. 18, 2012, and Chinese Application No. 201210398943.5, filed on Oct. 18, 2012. This application claims the benefit and priority of these prior applications and incorporates their disclosures be reference in their entirety.

BACKGROUND OF INVENTION

1. Field of the Invention

This invention relates to a fiber cutting device, particularly to a fully-automated optical fiber cutter.

2. Background Art

Optical fiber cutters are used for cutting fibers which are as fine as a hair. The cut fiber has a flat surface under several hundred fold magnifications. Only when the two cut fibers have flat incisions could they be fused with electric arc discharge. The common steps of using an optical fiber cutter are as follows:

1. Strip away the surface coating of the fiber using a fiber stripper, leaving about 30-40 mm, and then wrap the optical fiber with an alcohol-soaked cotton to clean the optical fiber;
2. Open the cover of an optical fiber clamp, and open the upper cover of a fiber cutter. Put the stripped fiber in the V-groove of the fiber clamp. Operator can adjust the length of the cut fiber as needed;
3. Press down the cover of the fiber clamp to fix the fiber;
4. Close the upper cover of the fiber cutter and insure that the end faces of the fibers are in a straight line;
5. Push the blade carrier to cut the fiber;
6. Open the upper cover of the fiber cutter, and pull back the blade carrier;
7. Rotate the knob on the collector to collect the waste fiber;
8. Take out the cut fiber carefully to avoid any damage to the end face of the fiber.

Along with the development and improvements of the fiber cutter products, some manufacturers have developed some products for simplifying the operation steps outlined above. For example, step 6 described above, pulling back the blade carrier, may be omitted, by for example having connector on the cover of the fiber cutter to engage the blade carrier, thereby when the cover of the fiber cutter is opened, the connector pushes the blade carrier back to the original ready position. However, the above described Step 3, Step 4, Step 5, and the operation of opening the up cover of the fiber cutter in Step 6 are unavoidable. In other words, there is no fully-automated optical fiber cutter in the existing technology, and all the automatic optical fiber cutters are semi-automatic.

SUMMARY

An object of this invention is to provide a fully-automated optical fiber cutter in order to solve the current technical problem due to lack of fully-automated optical fiber cutters.

In order to solve the above problem, this invention provides a fully-automated optical fiber cutter, which comprises an optical fiber cutter body and an optical fiber clamp. The optical fiber cutter body comprises a cutter cover body and a cutter main body, and one end of said cutter main body is pivotally connected to one end of the cutter cover body. Inside said cutter main body is movably provided with a blade-fixation seat, on which is provided with a blade for fiber cutting. Said fiber clamp is installed on the cutter main body, and the fiber clamp comprises a clamp main body and a clamp cover body. Said clamp main body is pivotally connected to said clamp cover body. The cutter cover body, the clamp cover body and the blade-fixation seat are linked through a linkage component. When the fiber cutter is not in use, the cutter cover body and the clamp cover body may be opened. When the fiber cutter is in use, the cutter cover body may be pressed to close, and the cutter cover body drives the clamp cover body to close and pushes the blade-fixation seat to move, thereby the blades are aligned to cut the fiber. After cutting, the cutter cover body may spring back and open.

Compared with the prior art, this invention has the following advantages:

This invention realizes full-automation of optical fiber cutters, simplifying the operating steps and increasing the work efficiency;

In addition, the unique pressure hammer structure in this invention achieves elastic fixation of fibers and elastic pressing of the fibers, thereby avoiding smashing of fiber cores.

Furthermore, in this invention, a collector may be bonded with the cutter main body by magnet attraction and by cooperating between a location post and a matching location hole, making it easier for an operator to disassemble and install the collector, and more convenient to use.

DETAILED DESCRIPTION

The present invention provides a type of fully-automated optical fiber cutters. A fully-automated optical fiber cutter of the invention comprises a fiber cutter body, a fiber clamp and a collector. The fiber clamp and the collector are separately installed on the fiber cutter body in a removable manner.

The fiber cutter body comprises a cutter cover body and a cutter main body. One end of said cutter main body is pivotally connected to one end of the cutter cover body. Inside the cutter main body is provided with a blade-fixation seat, on which is provided with a blade for fiber cutting.

A fiber clamp is installed on the cutter main body. A fiber clamp comprises a clamp main body and a clamp cover body. Said clamp main body is pivotally connected to said clamp cover body.

A collector comprises a collector body and a collector cover body. At the open end of the collector body and the collector cover body are provided with fiber-scroll components at corresponding locations. The fiber-scroll components control the fiber-scroll via a transmission component.

The cutter cover body, the cutter main body, the clamp cover body, the blade-fixation seat, the collector cover body and the transmission component are linked through a linkage component.

When the fiber cutter is not in use, the cutter cover body and the clamp cover body are open. When the fiber cutter is in use, the cutter cover body is pressed to close the cutter cover body, thereby driving the clamp cover body to close and pushing the blade-fixation seat to move. As a result, the blade is aligned and cuts the fiber. After cutting, the cutter cover body springs back and opened, thereby driving the collector to spool the fiber, and the collector cover body is opened. With reference to the drawings, the following provides more detailed description.

In this invention, a fiber cutter body, a fiber clamp and a collector are linked through a linkage component. In such an embodiment, the clamp main body is fixed to the cutter main body using a screw. The collector is linked to the cutter main body magnet attraction and by coordinated action of a location post fitting in a location hole. This design makes it convenient to disassemble the collector and to use different collectors depending on the different requirements of the customers. The main advantage of the invention lies in the use of various coupled linkage components to achieve the following: an operator need only to presses the cutter cover body to accomplish a series of operation steps: closing the clamp cover body, fixing the optical fiber, cutting the optical fiber, collecting the waste fiber, and automatically returning the blade. The following description together with the drawings will describe the relations of various linkage movements in more detail. The order of the description is unrelated to the order of the steps of operation.

Figure 1:
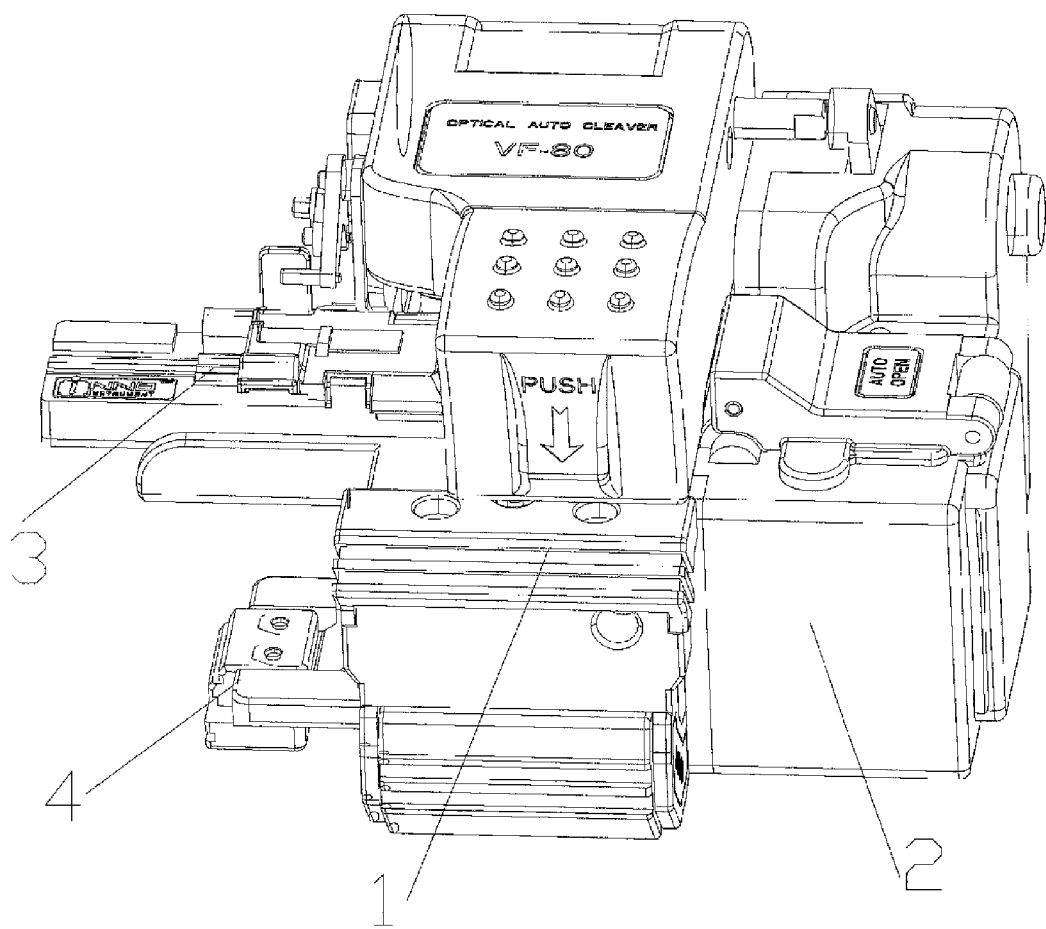
FIG. 1 shows a perspective view of a fully-automated optical fiber cutter of this invention in a closed state.
Figure 2:
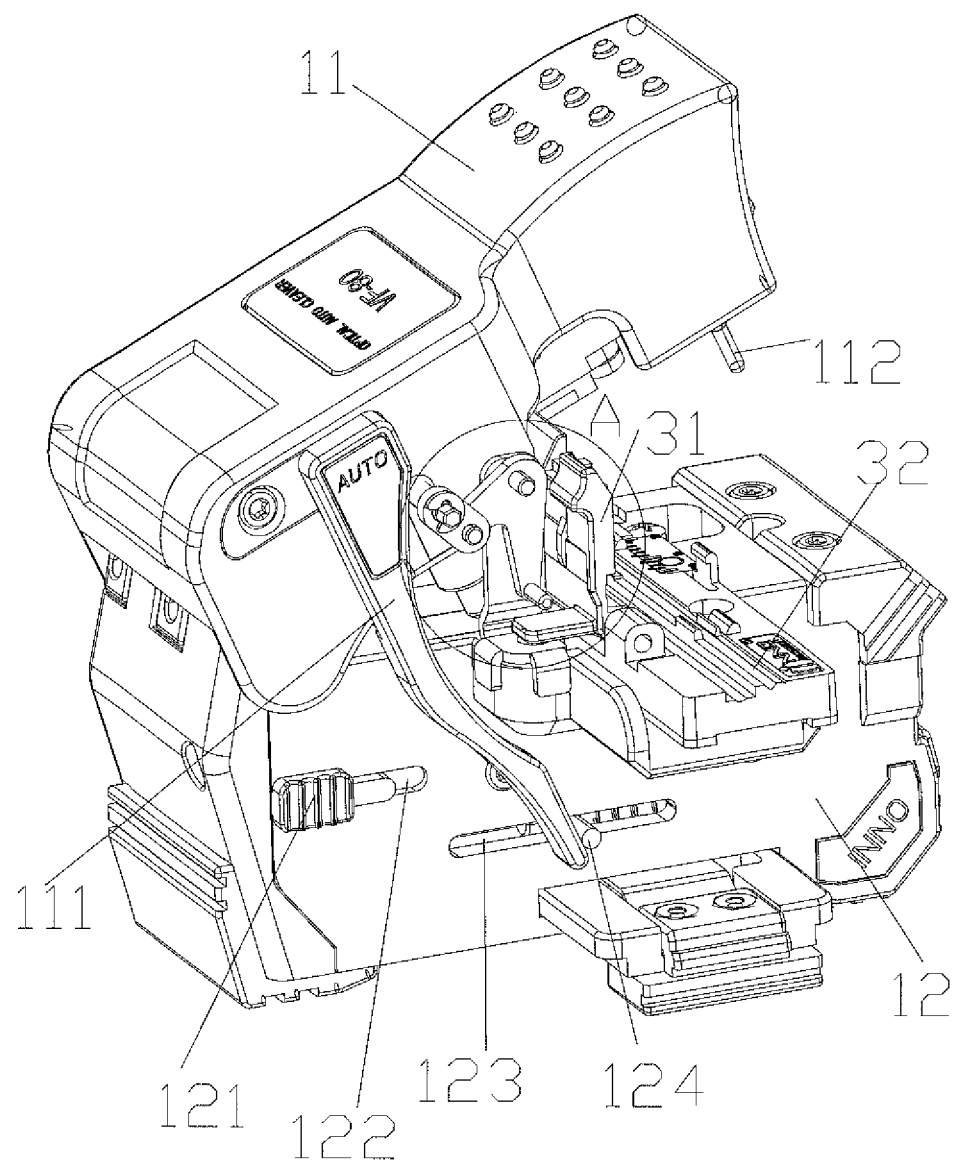
FIG. 2 shows a perspective view of a fully-automated optical fiber cutter of this invention in an open state.

Referring to FIG. 1 and FIG. 2, a fully-automated fiber cutter comprises a fiber cutter body 1, a fiber clamp 3, and a collector 2. The fiber cutter body 1 comprises a cutter cover body 11 and a cutter main body 12, and one end of the cutter main body 12 is pivotally connected to one end of the cutter cover body 11. Inside the cutter main body 12 is provided with a blade-fixation seat, on which is provided with a blade for fiber cutting.

The fiber clamp 3 comprises a clamp cover body 31 and a clamp main body 32, and the clamp main body 32 is pivotally connected to the clamp cover body 31. The clamp main body 32 is connected to the cutter main body 12 using a screw. The collector 2 and the cutter main body 12 are connected to each other via magnetic attraction and by a location post matching a location hole. The collector 2 comprises a collector body and a collector cover body. At the open end of the collector body and the collector cover body is provided with fiber-scroll components. The fiber-spool components control fiber spooling using a transmission component. The cutter cover body 11, the cutter main body 12, the clamp cover body 31, the blade-fixation seat, the collector cover body and the transmission components are linked through a linkage component. The following description, together with the drawings, will explain the linkage relationship among various components in detail.

In this embodiment, the cutter cover body 11 and the clamp cover body 31 are linked to move in a coordinated manner.

Figure 3:
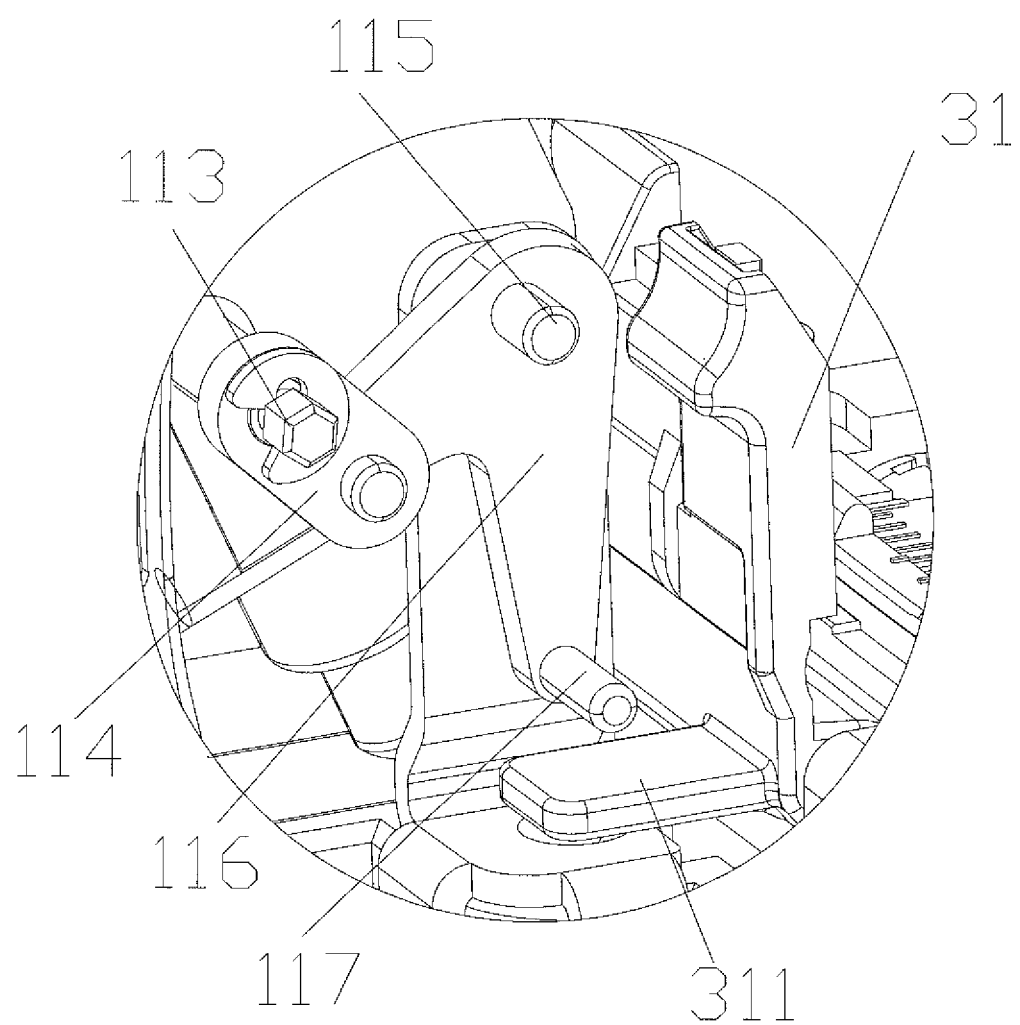
FIG. 3 shows a partial, expanded view A of a fully-automated optical fiber cutter of this invention.
Figure 4:
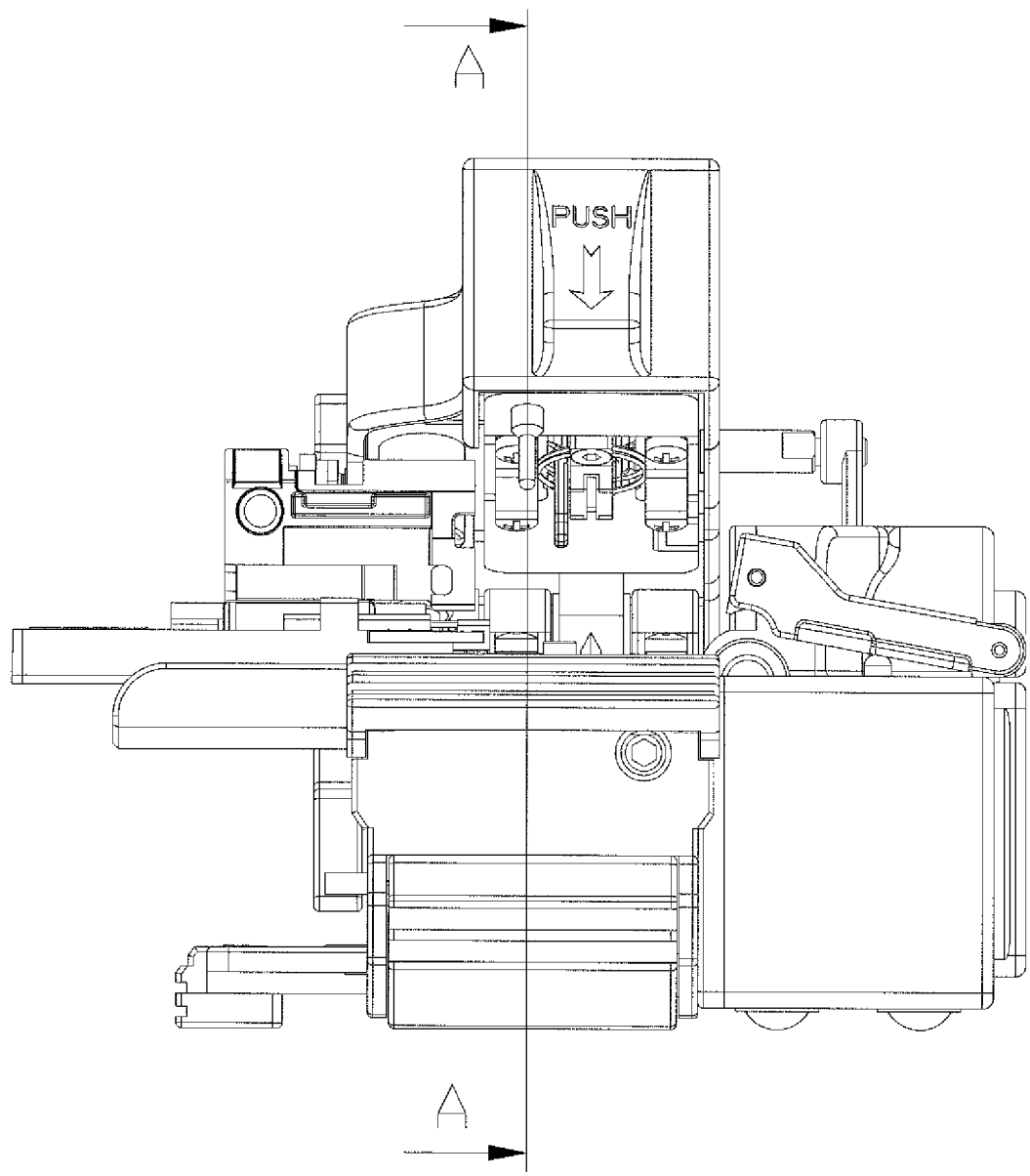
FIG. 4 shows a plan of a fully-automated optical fiber cutter of this invention in an open state.
Figure 5:
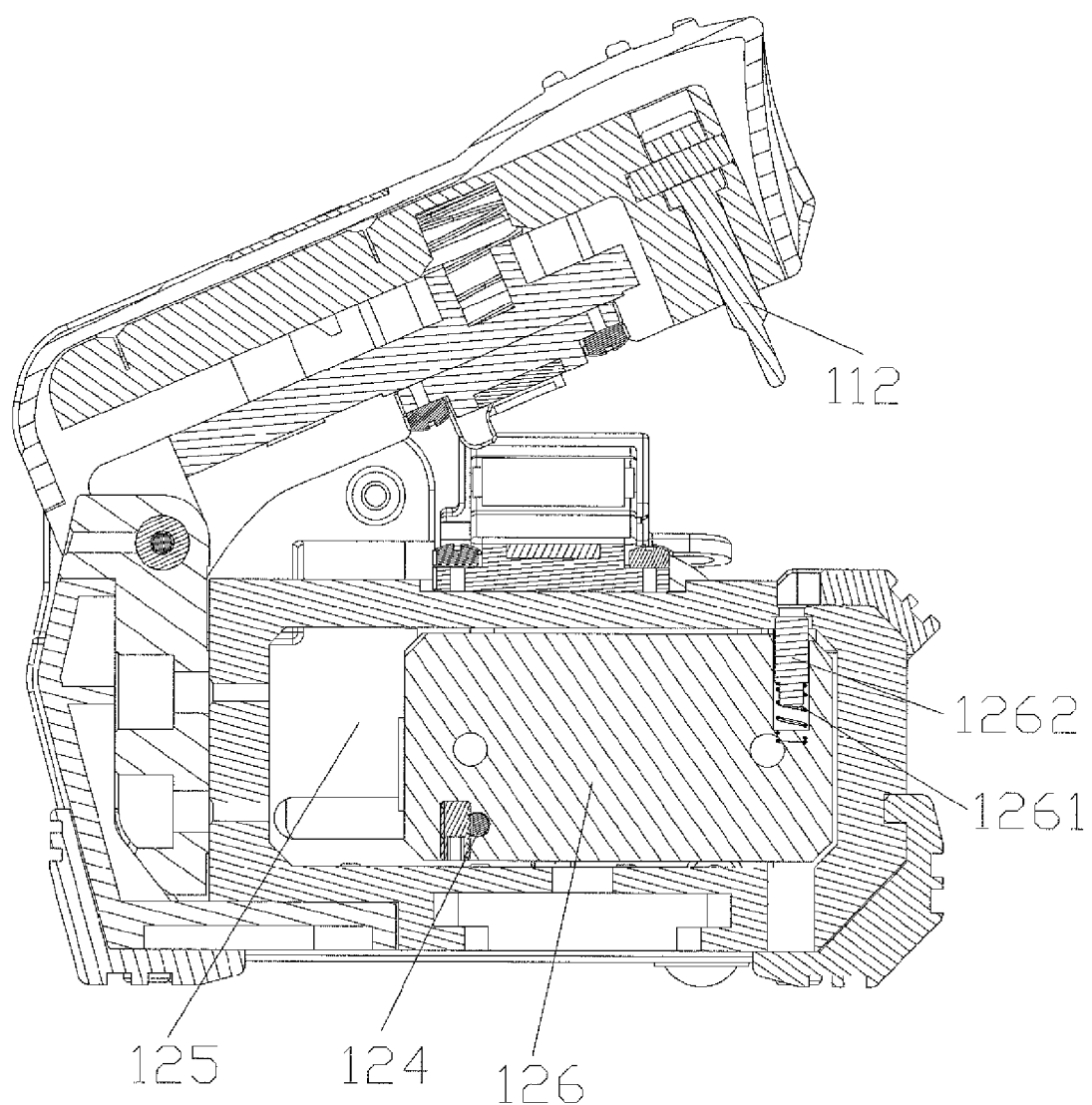
FIG. 5 shows a sectional view along A-A of a fully-automated optical fiber cutter of this invention.
Figure 6:
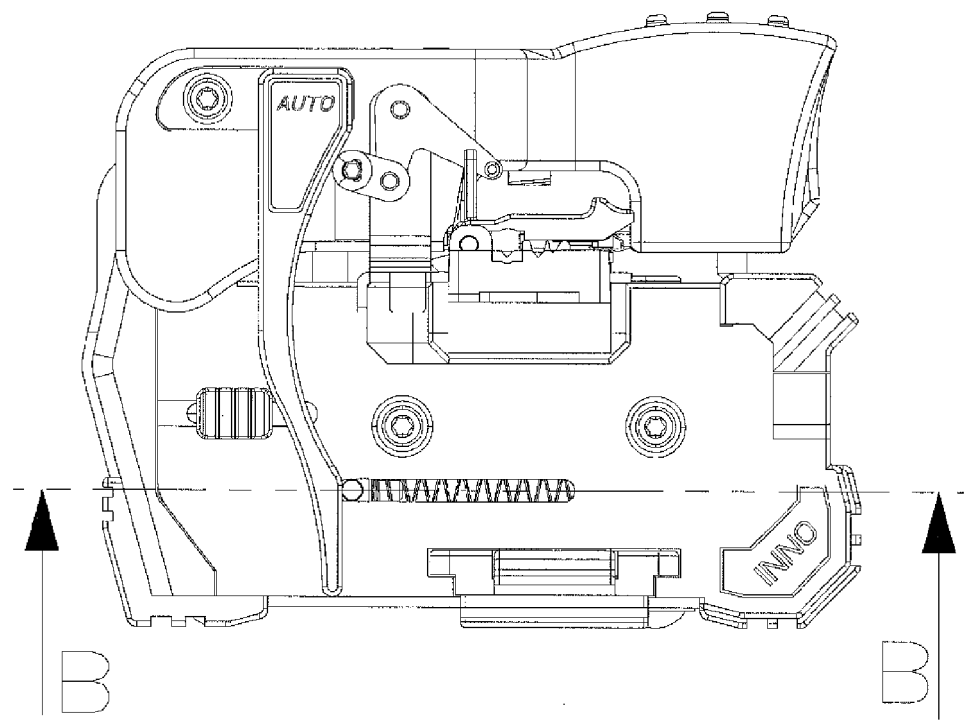
FIG. 6 shows a plan view of a fully-automated optical fiber cutter of this invention in a closed state.
Figure 7:
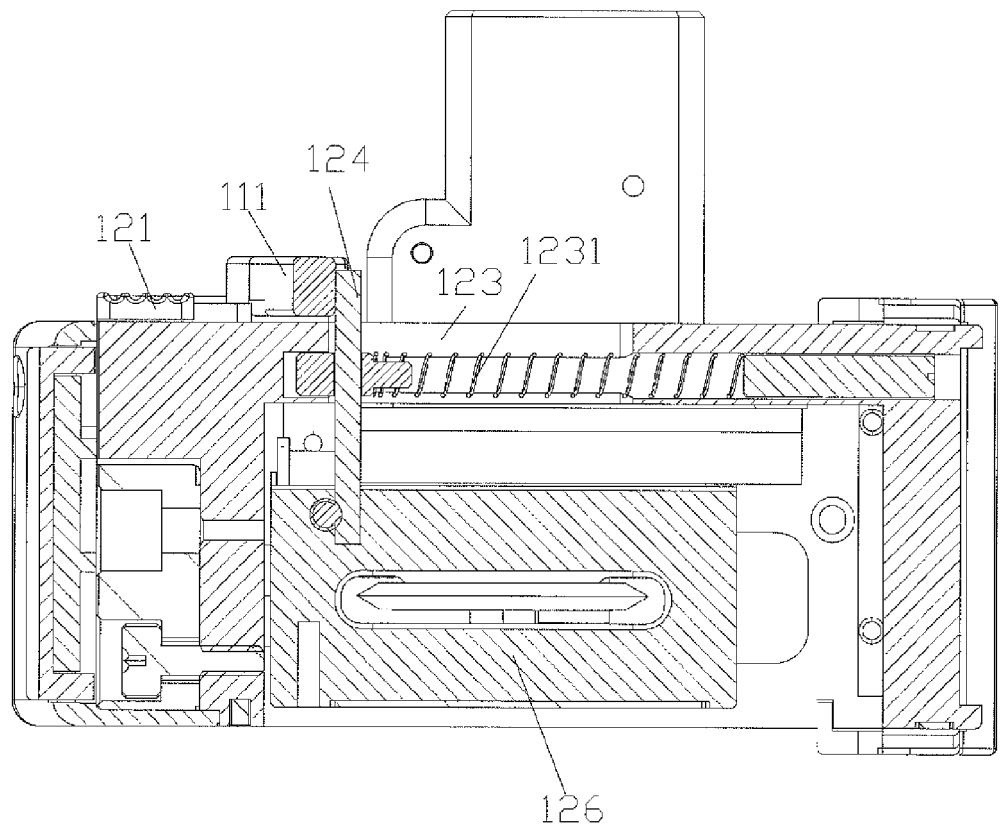
FIG. 7 shows a sectional view along B-B of a fully-automated optical fiber cutter of this invention.
Figure 8:
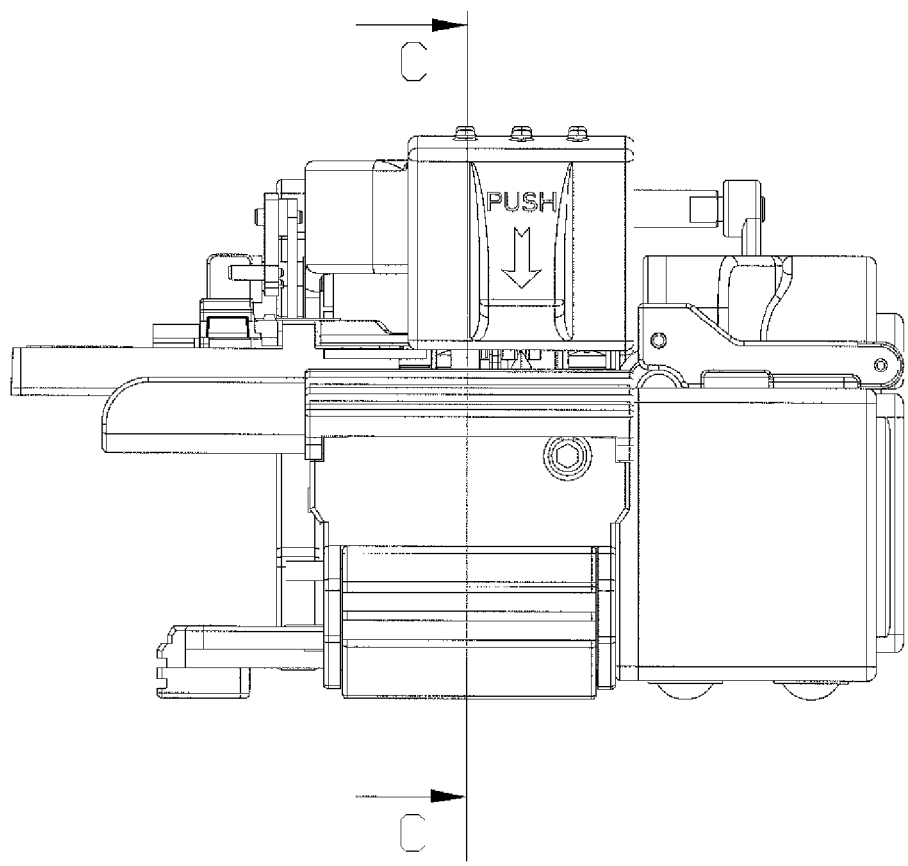
FIG. 8 shows a plan view 2 of a fully-automated optical fiber cutter of this invention in a closed state.
Figure 9:
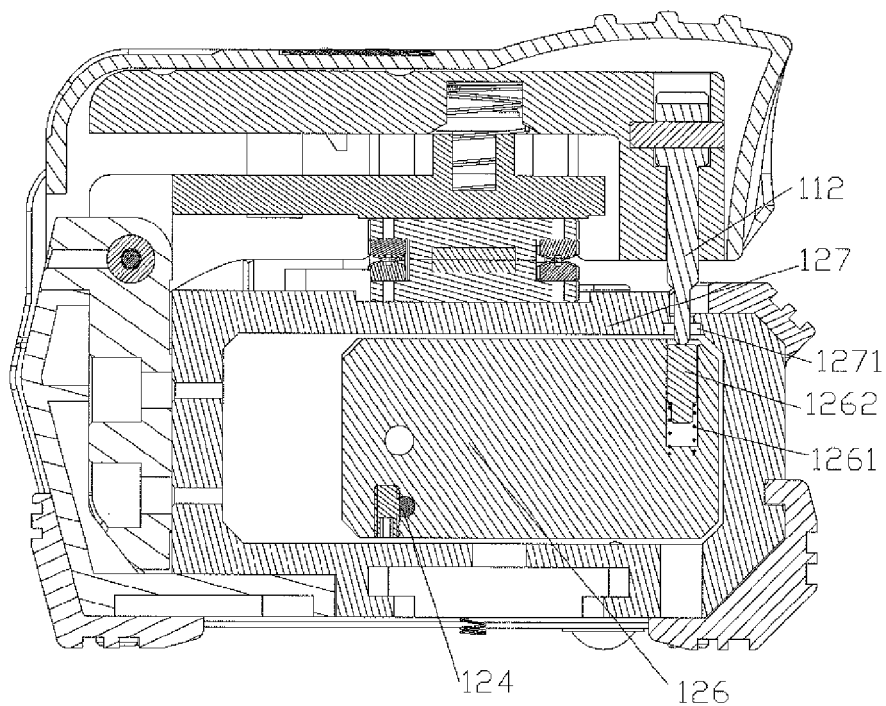
FIG. 9 shows a sectional view along C-C of a fully-automated optical fiber cutter of this invention.
Figure 10:
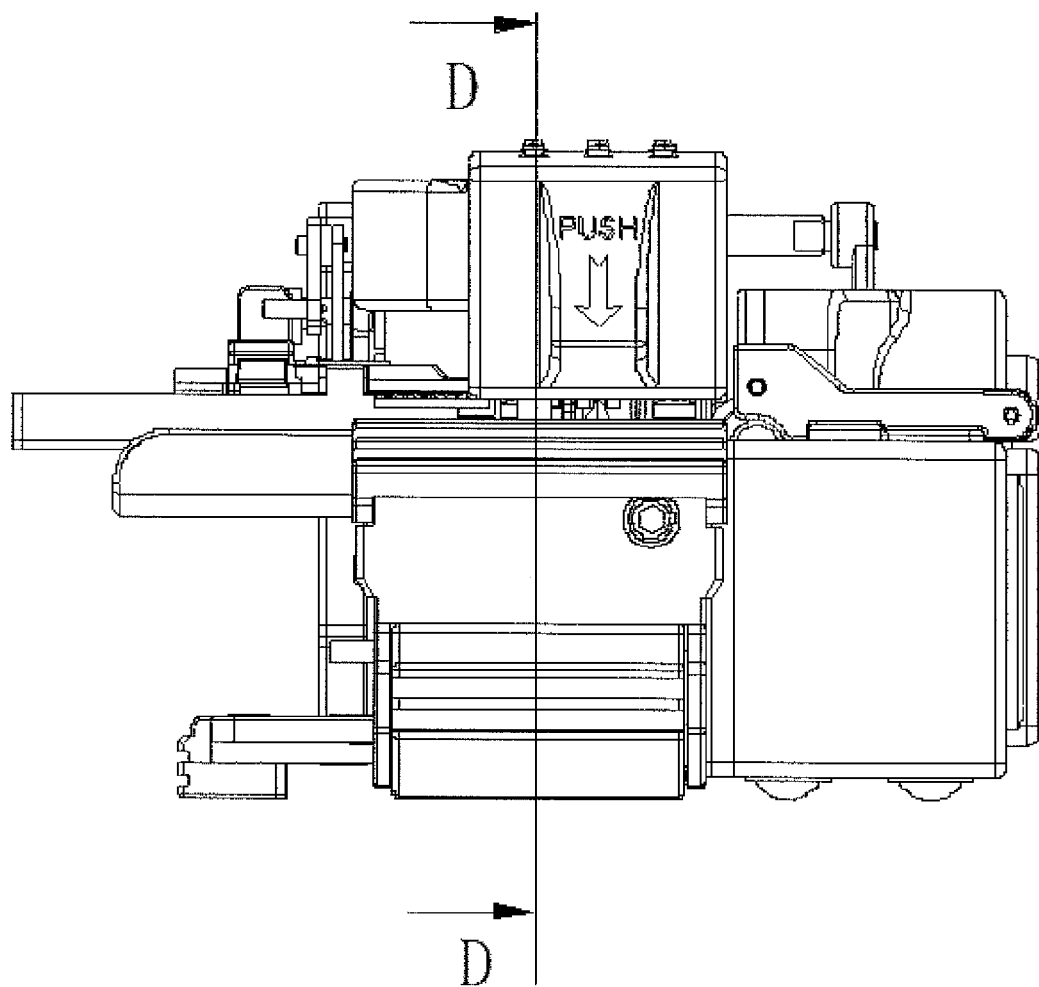
FIG. 10 shows a plan view 3 of a fully-automated optical fiber cutter of this invention in a closed state.
Figure 11:
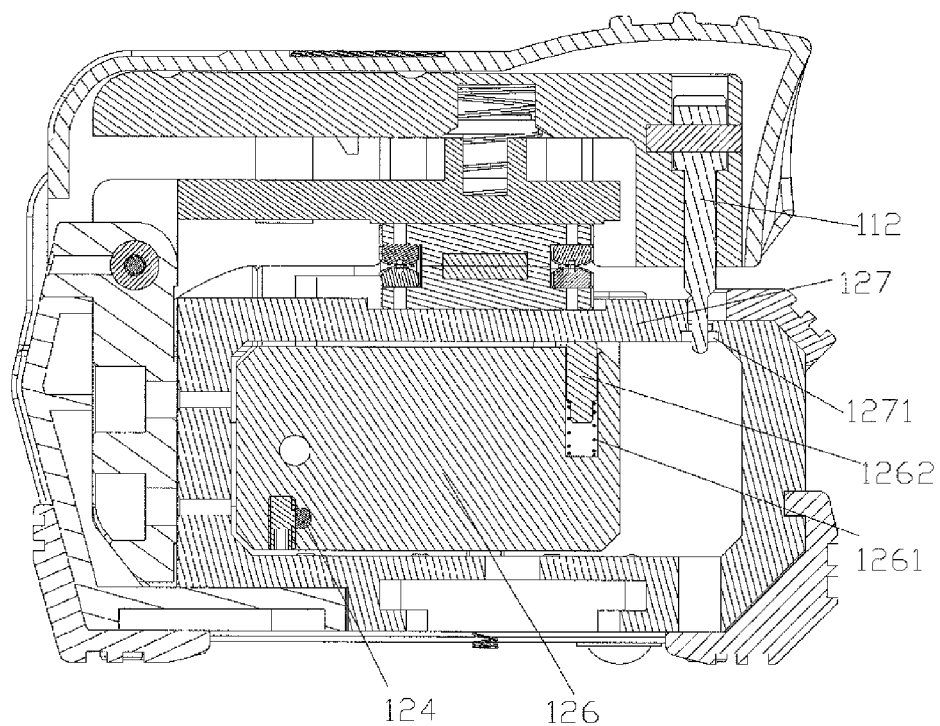
FIG. 11 shows a sectional view along D-D of a fully-automated optical fiber cutter of this invention.

Referring to FIG. 3, a linkage component comprises a first connecting shaft 113 and a second connecting shaft 115. The first connecting shaft 113 and the second connecting shaft 115 are both fixed on the cutter cover body 11. The first connecting shaft 113 is fixed to a connection strap 114. Specifically, the first connecting shaft 113 may be fixed to the upper end of the connection strap 114. The second connecting shaft 115 is movably connected to a V-shaped rotating plate 116. Specifically, the second connecting shaft 115 may be connected to the intersection of the two sides of the V-shaped rotating plate 116. The V-shaped rotating plate 116 can move in a arc or circle with the second connecting shaft 115 as the center. The lower end of the first side of the V-shaped rotating plate 116 is connected to the lower end of the connection strap 114. The lower end of the second side of the V-shaped rotating plate 116 is provided with a lever 117. At the corresponding location on the clamp cover body 31 is provided with a protrusion 311, which is proximate the joint of the clamp cover body 31. The lever 117 is located at the inside of the protrusion 311. When the cutter cover body 11 is closed, the second side of the V-shaped rotating plate 116 presses against the clamp cover body 31 to close the clamp cover body 31. When the cutter cover body 11 is opened, the lever 117 touches the protrusion 311 turns outward, and the clamp cover body 31 opens.

In this embodiment, the length of the first side of the V-shaped rotating plate 116 is shorter than the length of the second side of the V-shaped rotating plate 116.

In this embodiment, the side face of the cutter cover body 11 is fixedly connected to a driving lever 111. The driving lever 111 is relatively long and can extend to the lower end of the cutter main body 12. In this embodiment, the driving lever 111 is linked to the blade-fixation seat.

Referring to FIGS. 4-7, the inside of the cutter main body 12 is provided with an accommodating groove 125, and the blade-fixation seat 126 is movably installed in the accommodating groove 125. On the outside face of the cutter main body 12 is provided with a first bar-shaped guide slot 123, inside which a first spring 1231 is installed. The first spring 1231 is flexibly connected to a pushing lever 124. The outer end of the pushing lever 124 protrudes out of the first bar-shaped guide slot 123 and corresponds to the driving lever 111. The driving lever 111 can push the pushing lever 124 to move in the first bar-shaped guide slot 123. The inner end of the pushing lever 124 is fixed to a blade-fixation seat 126. When the cutter cover body 11 is closed, the driving lever 111 is located at the left side of the first bar-shaped guide slot 123. In this case, the driving lever 111 does not push the pushing lever 124. When the cutter cover body 11 is opened, the driving lever 111 is opened along with the opening of the cutter cover body 11 and pushes the pushing lever 124. When the pushing lever 124 is pushed, it presses against the first spring 1231. The pushing lever 124 moves to the right in the first bar-shaped guide slot 123, and the pushing lever 124 moves the blade-fixation seat 126 along to the right.

Referring to FIGS. 8-11, in this embodiment, the upper side of the accommodating groove 125 (i.e., the cutting platform 127 of the cutter main body) is connected to a platform hole 1271. Corresponding to the platform hole 1271, the open end of the cutter cover body 11 is provided with a pin 112. When the cutter cover body 11 is closed, the pin 112 can be inserted into the platform hole 1271. The upper end of the blade-fixation seat 126 is also provided with a blind hole. On the lower end of the blind hole, a second spring 1261 is installed. The upper end of the second spring 1261 is connected to a position-restricting pin 1262.

When the cutter cover body 11 is opened, the cutter cover body 11 drives the driving lever 111 to move to the right in a circular motion. The driving lever 111 touches the pushing lever 124, and the first spring 1231 is compressed. The driving lever 111 pushes the pushing lever 124 to move toward right. The pushing lever 124 pushes the blade-fixation seat 126 to move forward in the accommodating groove 125 (In this invention, the open end of the fiber cutter is referred to as the front, and the pivotal joint of the cutter cover body 11 and the cutter main body 12 is referred to as the back.). When the blade-fixation seat 126 moves forward, the position-restricting pin 1262 rubs against the upper groove wall (the inside face of the cutting platform 127) of the accommodating groove 125. The second spring 1261 is compressed. When the blade-fixation seat 126 moves to the rightmost end (referring to FIG. 9), the position-restricting pin 1262 moves to just below the platform hole 1271. Because of the expansion force of the second spring 1261, the second spring 1261 pushes up the position-restricting pin 1262, and the position-restricting pin 1262 is inserted into the platform hole 1271. The opening action of cutter cover body 11 then stops and the cutter cover body 11 remains stably open.

When the cutter cover body 11 closes, the pin 112 is inserted into the platform hole 1271, and presses the position-restricting pin 1262 downward to slide out of the platform hole 1271 from below. Because of the expansion force of the first spring 1231, the first spring 1231 pushes the pushing lever 124 to move from right to left. The pushing lever 124 drives the blade-fixation seat 126 to move backward (which is moving from right to left in this drawing). When the blade-fixation seat 126 moves to the rearmost (referring to FIG. 11), the operations of blade alignment on the blade-fixation seat 126 and fiber-cutting are complete.

In this embodiment, the end of the blade-fixation seat 126 is provided with a cushion, which can buffer the contact of the blade-fixation seat 126 with the cutter main body 12. According to this invention, the material for the cushion is not limited, as long as it can provide buffering action. A preferred material for the cushion is rubber.

Figure 12:
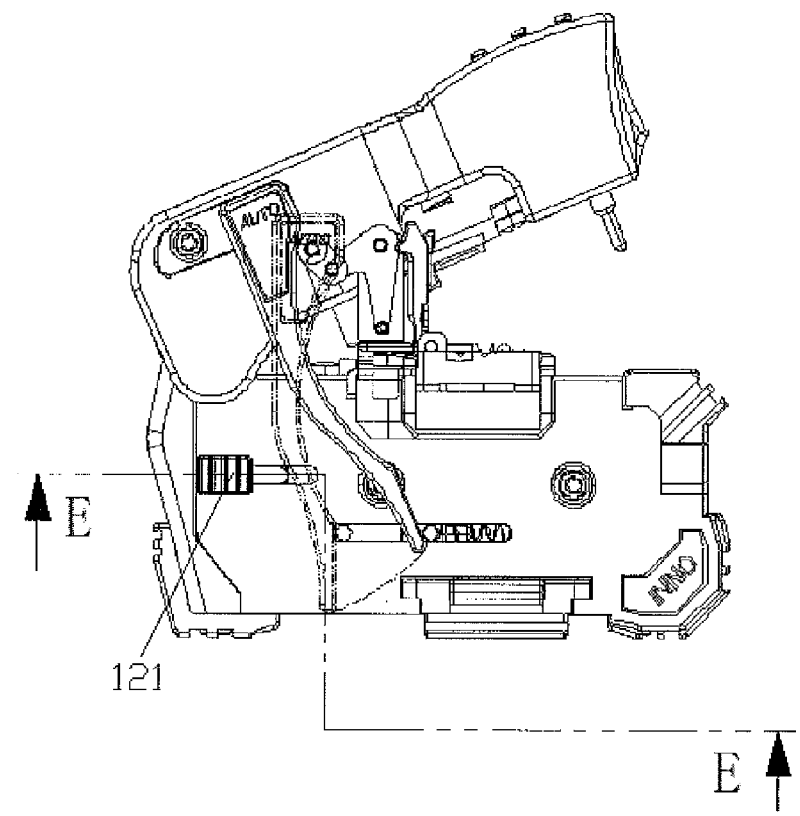
FIG. 12 shows a plan view 2 of a fully-automated optical fiber cutter of this invention in an open state.
Figure 13:
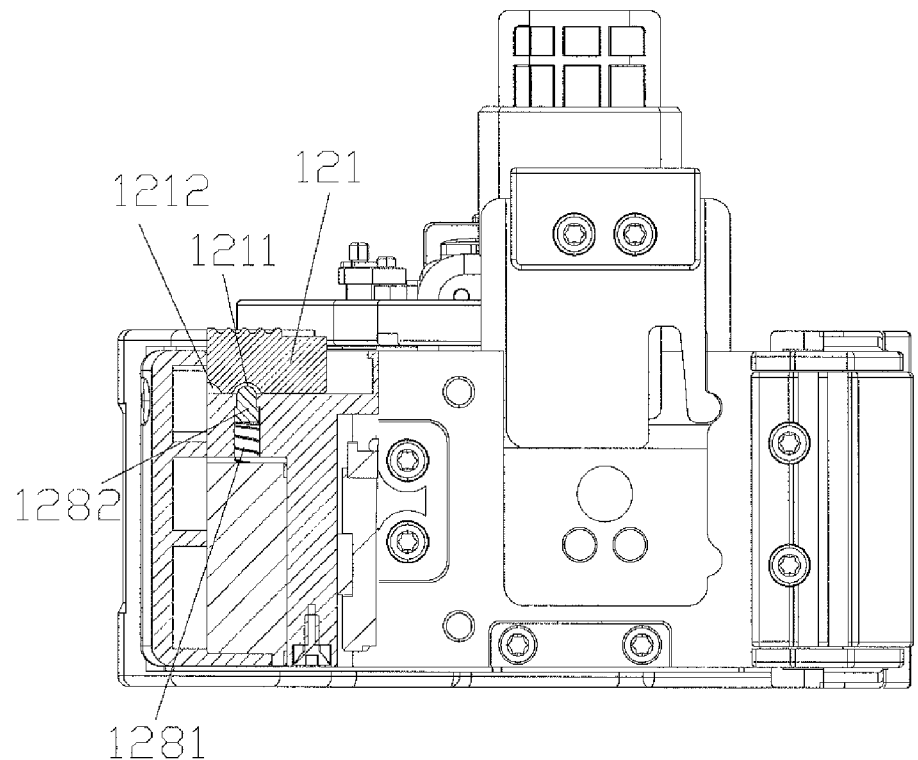
FIG. 13 shows a sectional view along E-E of a fully-automated optical fiber cutter of this invention.

Referring to FIGS. 12-13, in this embodiment, the inside face of the driving lever 111 is provided with a notch, which corresponds to a lock catch 121 movably disposed on the outside of the cutter main body 12. The lock catch 121 can be inserted into the notch to lock the driving lever 111 or separated from the notch to unlock the driving lever 111. The detailed structure is as follows:

The outside of the cutter main body 12 is provided with a second bar-shaped guide slot 122. The lock catch 121 is movably disposed in the second bar-shaped guide slot 122. The inside face of the lock catch 121 is provided with at least one groove. According to the invention, the number of such grooves is not particularly limited. In this embodiment, there are two grooves, one is the unlocking groove 1211 and the other is the locking groove 1212. The unlocking groove 1211 is located to the right of the locking groove 1212. The unlocking groove 1211 is proximate the driving lever 111. The inside of the cutter main body 12 is provided with a horizontal groove, which is connected with the second bar-shaped guide slot 122. The inside of the horizontal groove is provided with a third spring 1281. The upper end of the third spring 1281 is connected to a locking member, which can insert into the groove on lock catch 121. According to the invention, the shape and the material of the locking member are not particularly limited. In this embodiment, the locking member is a bead 1282, which can be inserted into the groove of the lock catch 121. When the bead 1282 is inserted into the locking groove 1212, the lock catch 121 is fixed and the end of the lock catch 121 is inserted into the notch of the driving lever 111, thereby the driving lever 111 is locked and becomes unmovable. In this case, the cutter can't be operated. When the bead 1282 is inserted into the unlocking concave 1211, the lock catch 121 is fixed, but the driving lever 111 is released to unlock and can move in a arc. In this case, the cutter can be operated normally. That is, the opening and closing movement of the cutter cover body 11 are not interfered by the lock catch 121. When the lock catch 121 is located between the locking groove 1212 and the unlocking groove 1211, it can move along the horizontal direction.

When the cutter is not in use, the cutter cover body 11 can be locked using the lock catch 121 in order to prolong the life of the blade. Specifically, when the cutter cover body 11 is closed, hold and keep the cutter cover body 11 closed, and at the same time move lock catch 121 to the right to the lock state. The end of the lock catch 121 is inserted into the notch of the driving lever 111. Because the driving lever 111 normally move in an arc, insertion of the lock catch 121 impedes the movement of the driving lever 111 such that the driving lever 111 can't continue to move upward in a circular motion, thereby the driving lever 111 is locked. Because the driving lever 111 is connected with the cutter cover body 11, the cutter cover body 11 is also locked.

Figure 14:
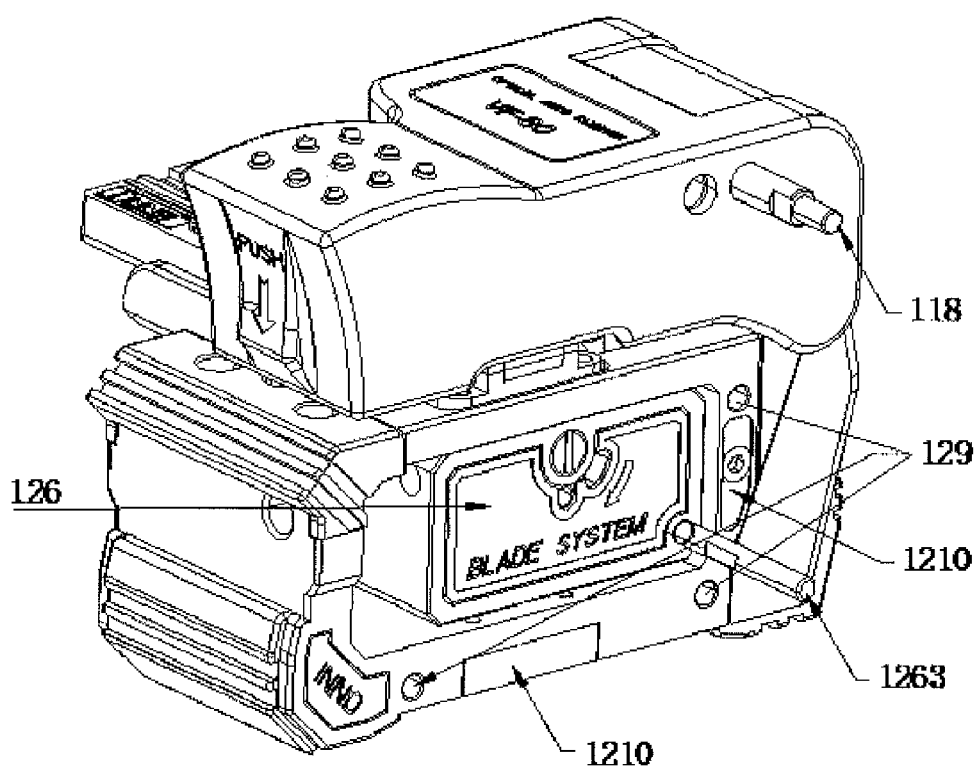
FIG. 14 shows a perspective view 2 of a fully-automated optical fiber cutter of this invention in a closed state.
Figure 15:
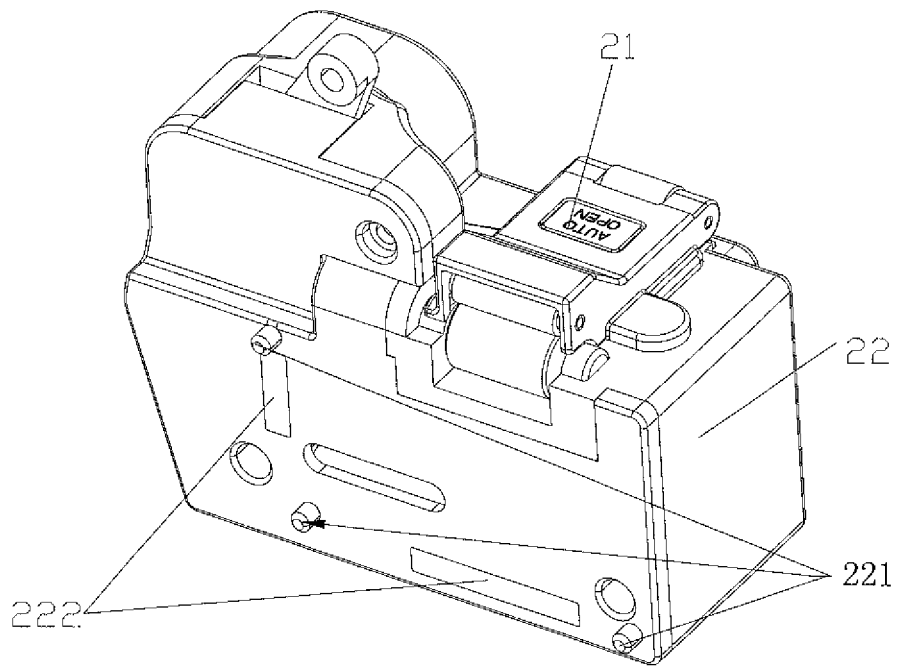
FIG. 15 shows a collector of a fully-automated optical fiber cutter of this invention.

Referring to FIGS. 14-15, in this embodiment, the collector 2 is bonded with the cutter main body 12 by magnetic attraction and by cooperation of a location post 221 and a location hole 129. This design makes it easier for an operator to disassemble and assemble the collector 2, facilitating the operation.

In this embodiment, the side of cutter main body 12 is provided with several location holes 129. The side of collector body 22 is provided with several location posts 221, which correspond to the location holes 129. The location posts 221 can insert into the location holes 129 to fix the location. The cutter main body 12 is also provided with a magnetizer 1210, and the collector 2 is correspondingly provided with a magnetic body 222. The magnetizer 1210 and the magnetic 222 can attract each other to fix the connection.

Figure 16:
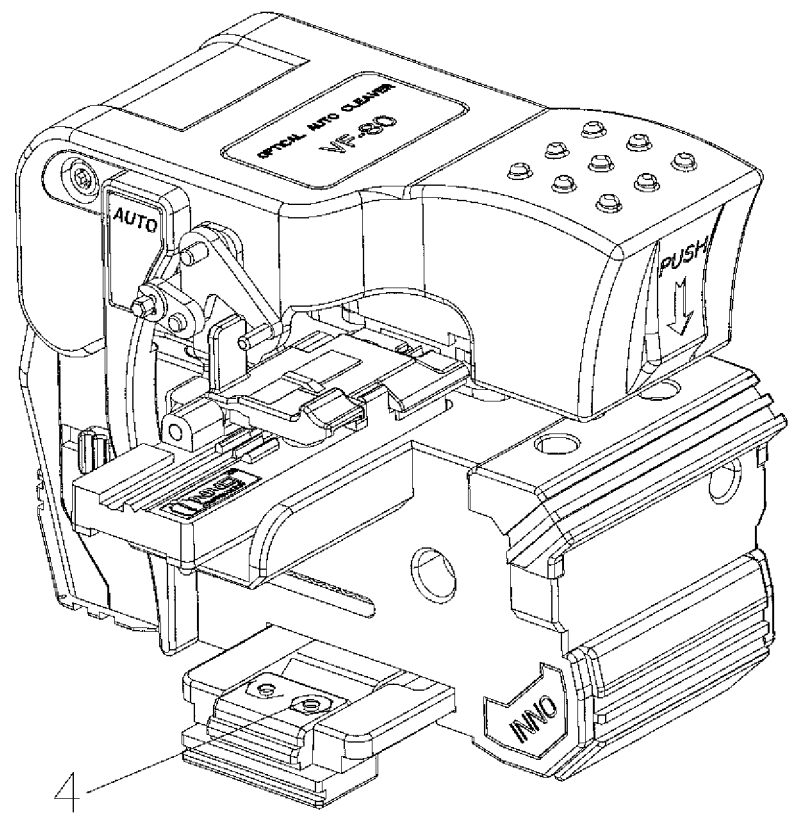
FIG. 16 shows a diagram illustrating a fully-automated optical fiber cutter of this invention with an extended foot pad.
Figure 17:
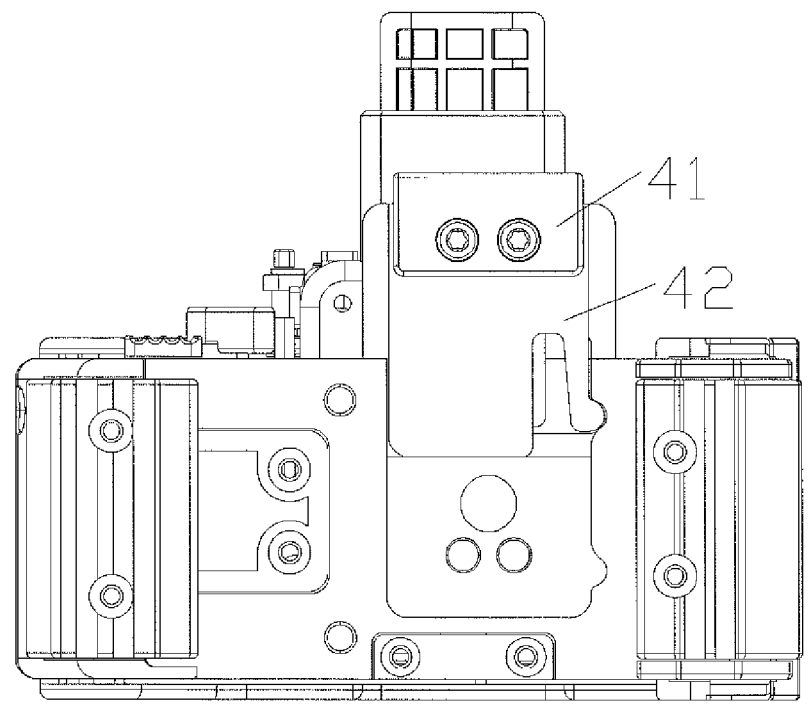
FIG. 17 shows a view from the bottom of a fully-automated optical fiber cutter of this invention.

Referring to FIGS. 16-17, in this embodiment, the bottom of the cutter main body 12 is provided with a foot pad 4 which can be extended or retracted. When using the cutter on a platform, the foot pad 4 can be pulled-out to balance the cutter, making it more stable and producing better cutting. In this embodiment, the foot pad 4 and the collector 2 are located on different sides of the cutter main body 12.

In this embodiment, the bottom of the cutter main body 12 is provided with a bottomless accommodating groove, and the foot pad 4 is movably connected in bottomless accommodating groove. The foot pad 4 comprises a foot pad supporter 41 and a foot pad position-restricting part 42. The foot pad supporter 41 is connected to the lower part of the foot pad position-restricting part 42.

Figure 18:
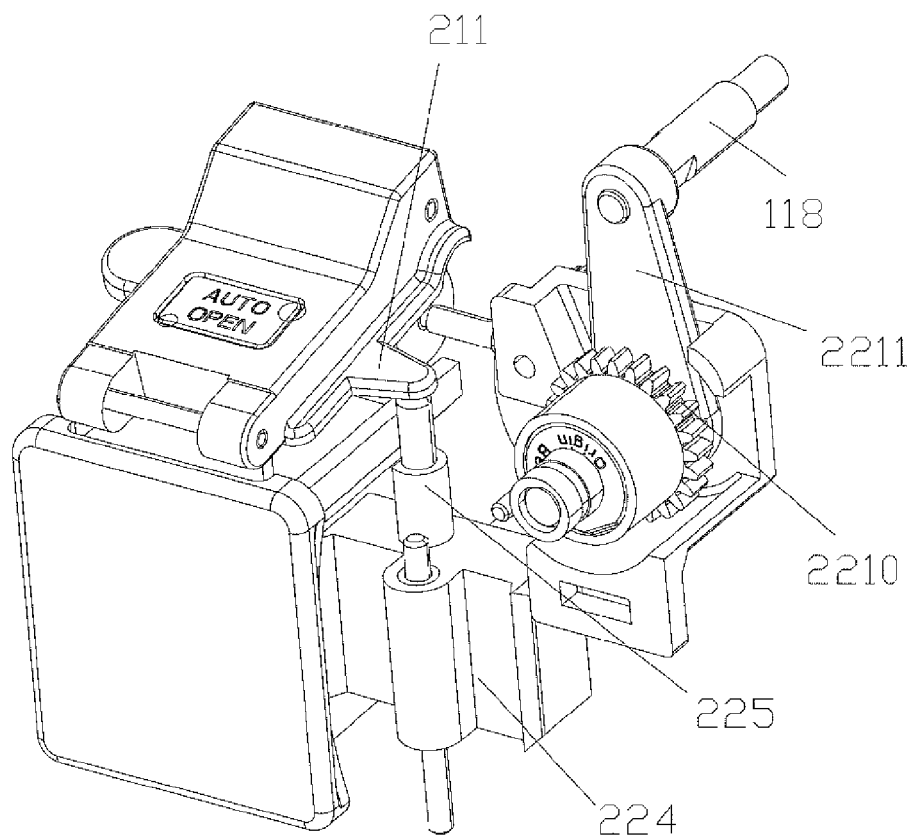
FIG. 18 shows a first view of internal structures of a collector of a fully-automated optical fiber cutter of this invention.
Figure 19:
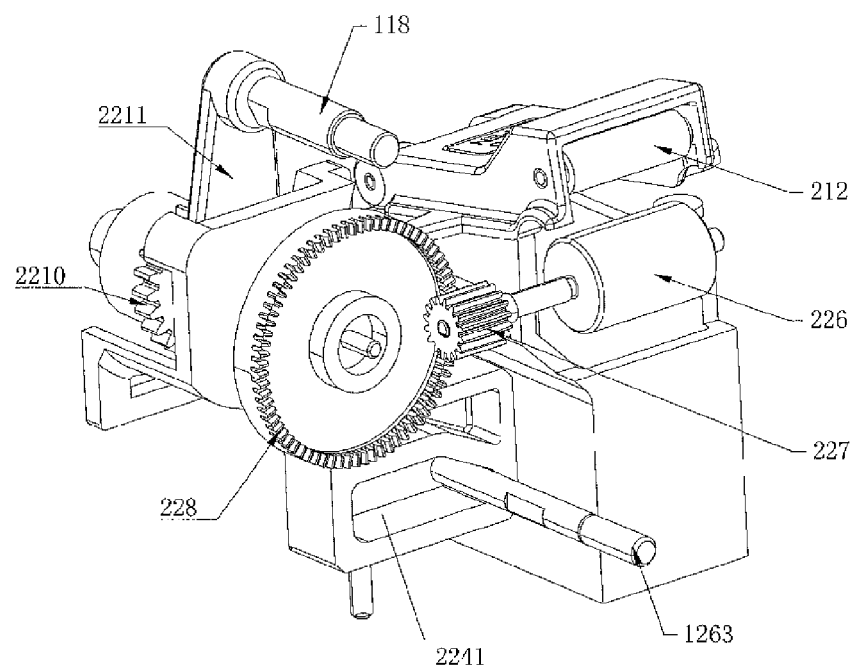
FIG. 19 shows a second view of internal structures of a collector of a fully-automated optical fiber cutter of this invention.
Figure 20:
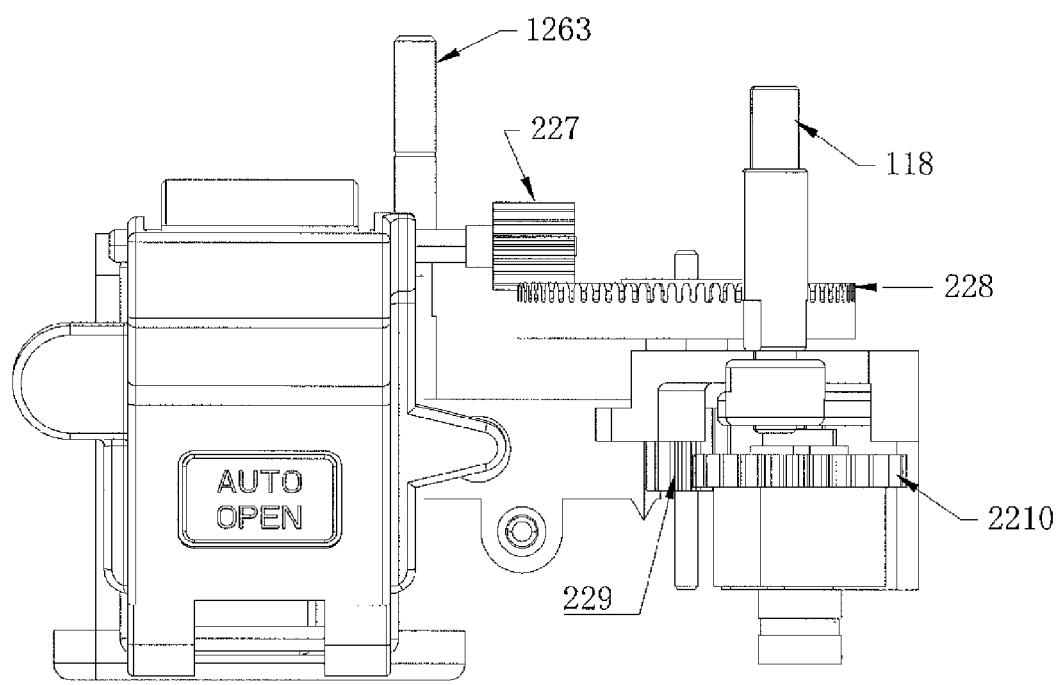
FIG. 20 shows a gear drive inside a collector of a fully-automated optical fiber cutter of this invention.

Referring to FIGS. 18-20, in this invention, a linkage structure between the fiber cutter body 1 and the collector 2 is as follows:

The blade-fixation seat 126 is fixedly provided with a first linkage lever 1263, which can unlock or lock the collector cover body 21 using an elevator mechanism.

In this embodiment, the collector cover body 21 is provided with a protruding pinna 211; and the outside of the collector body 22 is provides with an elevator mechanism. The elevator mechanism and the protruding pinna 211 are at corresponding location. The elevator mechanism is movably connected to the first linkage lever 1263. When the cutter cover body 11 is open, the driving lever 111 pushes the pushing lever 124. The pushing lever 124 then pushes the blade-fixation seat 126 to move. Then, the blade-fixation seat 126 makes the first linkage lever 1263 move, and the first linkage lever 1263 pushes the elevator mechanism to rise. The elevator mechanism touches the protrusion pinna 211 of the collector cover body 21 and makes the collector cover body 21 open. The elevator mechanism comprises a elevator chunk 224 and a elevator rod 225. The elevator rod 225 is connected to the upper end of the elevator chunk 224. The elevator chunk 224 is provided with a sliding groove 2241, in which the first linkage lever 1263 can slide horizontally. The groove wall of the sliding groove 2241 is provided with a slope. When the cutter cover body 11 is open, the driving lever 111 drives the blade-fixation seat 126 to move. The blade-fixation seat 126 drives the first linkage lever 1263 to move horizontally in the sliding groove 2241. When the first linkage lever 1263 encounters the slope of the sliding groove 2241, the slope forces the elevator chunk 224 to rise, and the elevator chunk 224 drives the elevator rod 225 to rise. The elevator rod 225 pushes the protrusion pinna 211 up, and the collector 2 begins to spool the fiber automatically. When the cutter cover body 11 is closed, the blade-fixation seat 126 moves back and drives the first linkage lever 1263 to move back in the sliding groove 2241. The first linkage lever 1263 leaves the slope in the sliding groove 2241. The elevator chunk 224 descends. The elevator chunk 224 brings the elevator rod 225 lower. After that, the elevator rod 225 separates from the protrusion pinna 211, and the collector cover body 21 is closed.

In this embodiment, the structure of collector 2 automatic fiber spooler is as follows:

Said cutter cover body 11 is also provided with a second linkage lever 118. Said collector cover body 21 is provided with an upper fiber-spool shaft 212, and said collector 2 is provided with a lower fiber-spool shaft 226, which corresponds to the location of said upper fiber-spool shaft 212. Said upper fiber-spool shaft 212 and said lower fiber-spool shaft 226 are both rotationally installed on the open end of said collector cover body 21. Said lower fiber-scroll shaft 226 is connected to a transmission component, which is connected to said second linkage lever 118. When said cutter cover body 11 is opened, it drives said second linkage lever 118 to move, which in turn drives said transmission component to move. Then, said transmission component drives said lower fiber-spool shaft 226 to rotate. Finally, said lower fiber-spool shaft 226 drives said upper fiber-scroll shaft 212 to spool the fiber.

The transmission component comprises a turning block 2211, a ratchet component and a gear component. The turning block 2211 is fixedly connected to the second connecting lever 118. The ratchet component comprises a ratchet wheel 2210 and a ratchet shaft, and the ratchet wheel 2210 is sleeved on the ratchet shaft, around which the ratchet wheel 2210 can rotate in a single direction. The ratchet shaft is fixed to the turning block 2211. The gear component comprises a small gear wheel 229, a worm wheel 228 and a fiber-spool gear 227. The small gear wheel 229 is fixedly, coaxially connected to the worm wheel 228. The small gear wheel 229 meshes with the ratchet wheel 2210 and transmits motion in a single direction. The worm wheel 228 meshes with the fiber-spool gear 227. The fiber-spool gear 227 is fixedly, coaxially connected to the lower fiber-spool shaft 226. When the cutter cover body 11 opens, the cutter cover body 11 drives the second connecting lever 118 to move in an arc motion. Then, the second connecting lever 118 drives the turning block 2211 to rotate. The turning block 2211 rotates the ratchet shaft. The ratchet shaft rotates the ratchet wheel 2210 in a single direction, and the ratchet wheel 2210 rotates the small gear wheel 229. The small gear wheel 229 rotates the worm wheel 228. The worm wheel 228 then rotates the fiber-spool gear 227, and the fiber-spool gear 227 rotates the lower fiber-spool shaft 226. The lower fiber-spool shaft 226 rotates the upper fiber-spool shaft 212 to accomplish automatic spooling of the fiber by collector 2.

Figure 21:
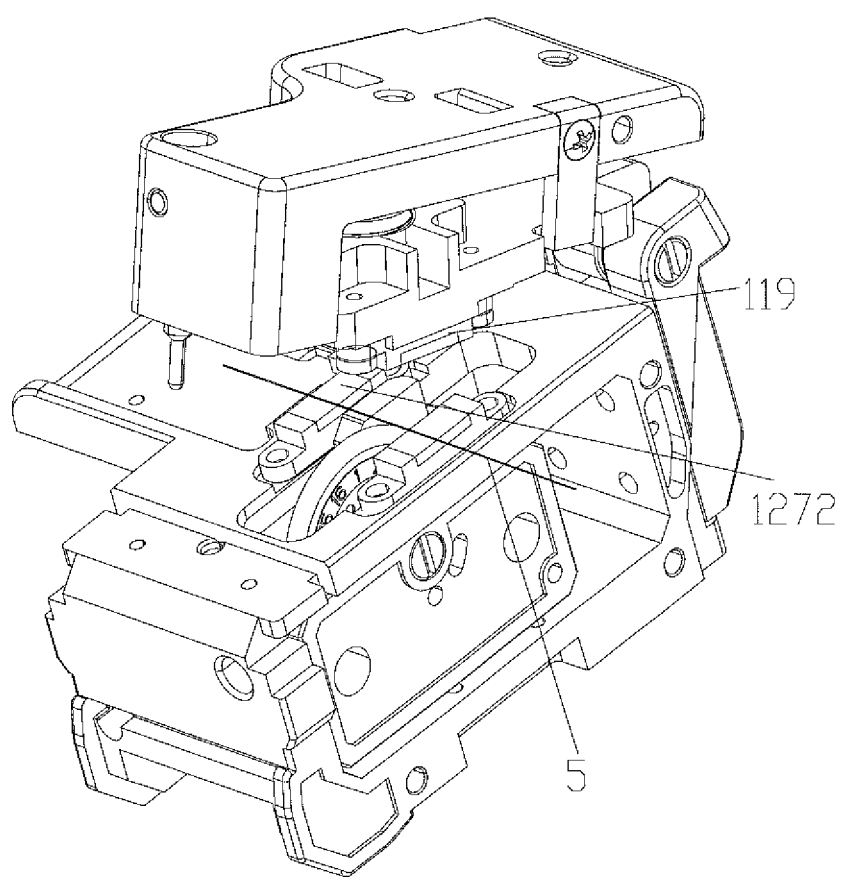
FIG. 21 shows a pressure hammer member inside a fully-automated optical fiber cutter of this invention.
Figure 22:
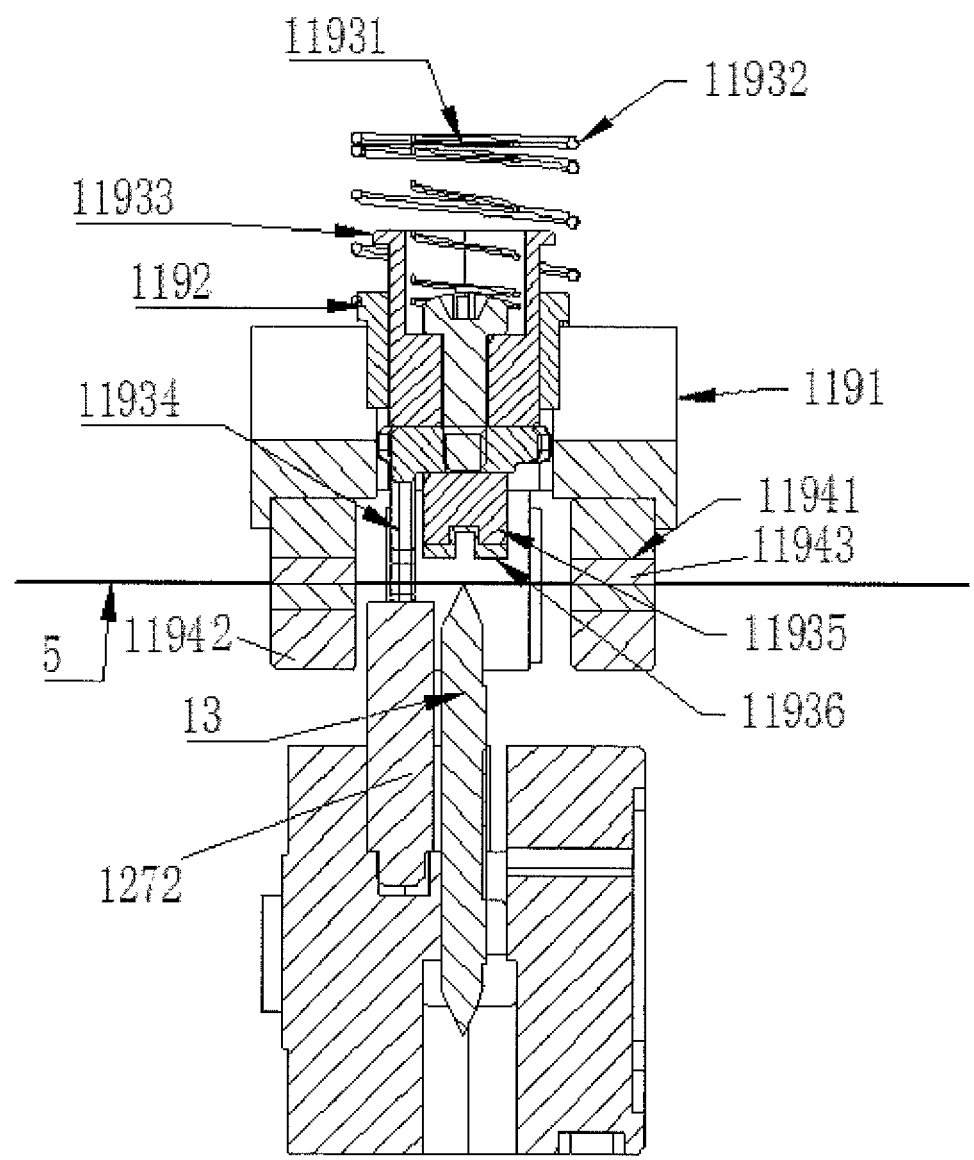
FIG. 22 shows the internal structures of a pressure hammer member of a fully-automated optical fiber cutter of this invention.

In this embodiment, the structure for an automatic fiber cutter is as follows:

Referring to FIGS. 21-22, in this invention, a linkage component further comprises a pressure hammer member 119, which is installed on the inside of the cutter cover body 11. The pressure hammer member 119 comprises a pressure hammer body 1191, a fiber fixing component and a fiber-pressing component. The pressure hammer body 1191 is movably connected to the inside of the cutter cover body 11, and the fiber fixing component is connected to the lower end of the pressure hammer body 1191. When the cutter cover body 11 is closed, the fiber-fixing component fixes the two ends of a fiber 5. The middle part of the pressure hammer body 1191 is provided with a first circular hole, in which the fiber-pressing component is movably installed. The fiber-pressing component is also flexibly connected to the cutter cover body 11 and is located between the two fixed ends of the fiber-fixing component. When the cutter cover body 11 is closed, the fiber-pressing component is pressed, and its location corresponds to the location of the blade 13. Then the fiber-pressing component presses on the fiber 5 elastically, thereby the blade 13 cuts the fiber 5. After cutting the fiber 5, the cutter cover body 11 is opened, and the fiber-pressing component springs back to the original position.

Figure 23:
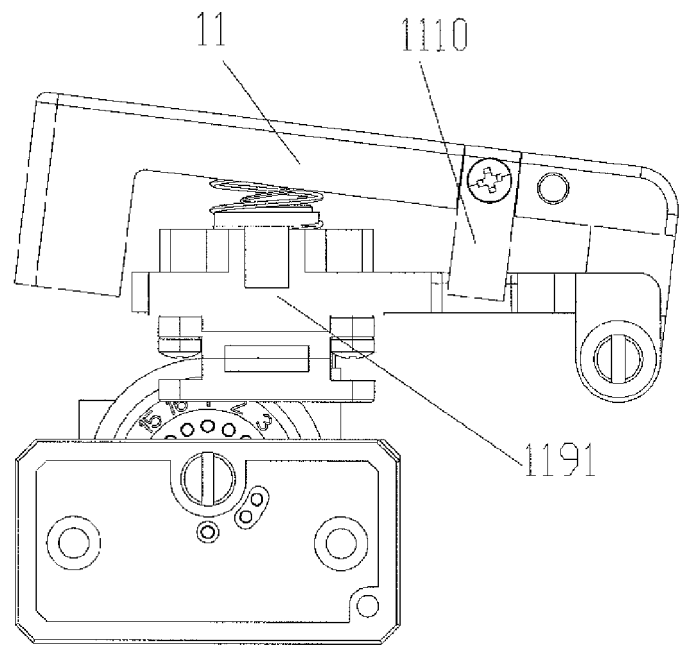
FIG. 23 shows a diagram illustrating the connection between a pressure hammer member and a cutter cover body of a fully-automated optical fiber cutter of this invention.

Referring to FIG. 23, in this embodiment, an end of the pressure hammer body 1191 is pivotally connected to an rotation axle of the cutter cover body 11. There is a gap between the pressure hammer body 1191 and the inside face of the cutter cover body 11, and the pressure hammer body 1191 is flexibly connected to the inside face of the cutter cover body 11. In addition, an end of the pressure hammer body 1191 is hooked to the cutter cover body 11 through a hooking board. In this embodiment, one side of the cutter cover body 11 is fixedly connected to a hooking board 1110, the lower end of which is provided with a hooking buckle. Corresponding to the location of the hooking buckle, the pressure hammer body 1191 is provided with a hooking hole. When the cutter cover body 11 is opened, the hooking buckle of the hooking board 1110 is hooked in the hooking hole. When the cutter cover body 11 is closed, because the pressure hammer body 1191 is elastically pressed, the gap between the pressure hammer body 1191 and the inside of the cutter cover body 11 decreases. Then, the hooking buckle is separated from the hooking hole, and the pressure hammer body 1191 continues to be pressed. Therefore, the fiber-fixing component can fix the two ends of the fiber 5, and the fiber-pressing component presses the fiber 5 to the blade to effect the cut. After the fiber 5 has been cut, the cutter cover body 11 is opened. Due to the expansion force of a spring 11932, the fiber-pressing component springs up toward the inside of the cutter cover body 11 until the hooking buckle at the lower end of the hooking board 1110 is stuck in the hooking hole on the side of pressure hammer body, thereby the pressure hammer member 119 returns to the original position.

In this embodiment, the first circular hole of the pressure hammer body 1191 is fixedly connected to a pressure hammer sleeve 1192. The center part of the pressure hammer sleeve 1192 is provided with a second circular hole, and the upper end of the pressure hammer sleeve 1192 is provided with a hooking border, which is an outward protrusion. The hooking border is stuck at the upper end face of the pressure hammer body 1191. In this embodiment, the pressure hammer body 1191 is elastically connected to the cutter cover body 11 through a spring 11932. The lower end of the spring 11932 is sleeved on the hooking border of the pressure hammer sleeve 1192, and the upper end of the spring 11932 is connected to the inside of the cutter cover body 11. In this embodiment, the first circular hole of the pressure hammer body 1191 is a circular through hole, and the corresponding pressure hammer sleeve 1192 is cylindrical. However, the shapes of the pressure hammer body and the pressure hammer sleeve are not limited to circular.

In this embodiment, the fiber-pressing component comprises a fiber-pressing elastic body, a fiber-pressing sliding block 11933, a supporting rod 11934, and a fiber-pressing part 11935. The fiber-pressing sliding block 11933 is slidably installed in the second circular hole of the pressure hammer sleeve 1192, and there is a gap between the fiber-pressing sliding block 11933 and the pressure hammer sleeve 1192 so as to facilitate up-and-down sliding movement of the fiber-pressing sliding block 11933 in the pressure hammer sleeve 1192. The fiber-pressing sliding block 11933 is elastically connected to the inside of the cutter cover body 11 through the fiber-pressing elastic body. A fiber-pressing elastic body of the invention is not particularly limited. In this example, the fiber-pressing elastic body is a fiber-pressing spring 11931. Correspondingly, a slot hole is installed inside the upper end of the fiber-pressing sliding block 11933, and the upper end of the fiber-pressing sliding block 11933 is provided with a hurdle border, which is an outward protrusion. The fiber-pressing spring 11931 is installed in the slot hole and is connected to the cutter cover body 11. In this embodiment, the supporting rod 11934 has an L shape, and its horizontal rod is fixed to the bottom of the fiber-pressing sliding block 11933 and its vertical rod is fixed to one side of the fiber-pressing sliding block 11933. The fiber-pressing part 11935 is located at the inner side of the supporting rod 11934 and fixed to the horizontal rod of the supporting rod 11934. When the cutter cover body 11 is closed, the fiber-pressing part 11935 is aligned with the blade 13. When in use, the bottom of the fiber-pressing part 11935 is provided with a fiber-pressing rubber 11936 to prevent the fiber-pressing part 11935 from crushing the fiber. In this embodiment, the fiber-pressing sliding block 11933 is cylindrical. The cylindrical structure is less likely to result in a jammed condition when it slides, thereby during the sliding action, and the fiber-pressing slide block 11933 is prevented from stopping due to jamming.

Figure 24:
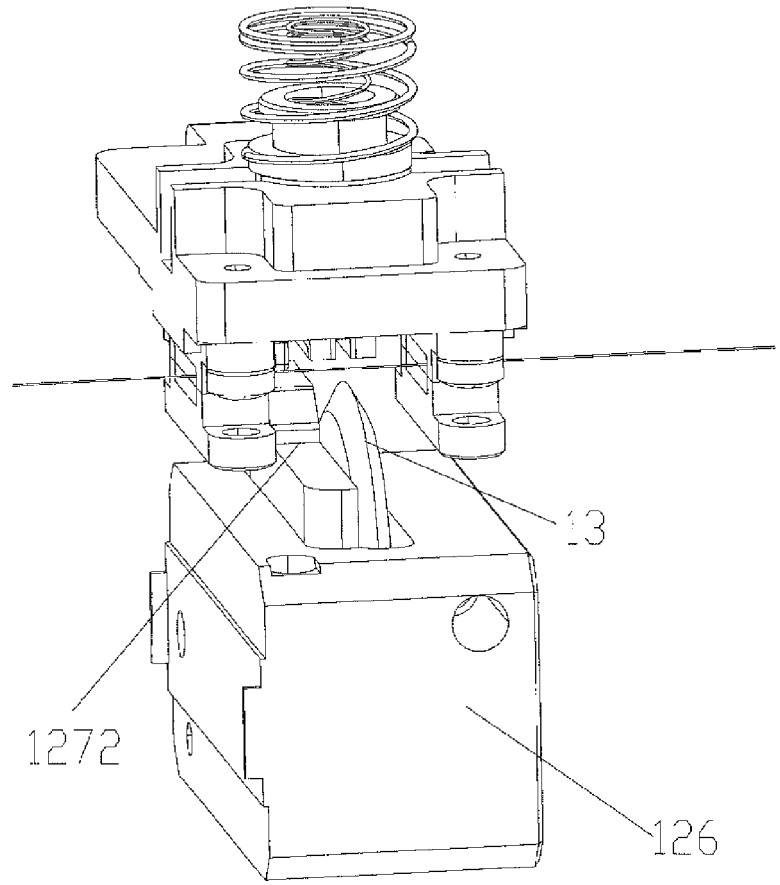
FIG. 24 shows a connector structure of a pressure hammer member of a fully-automated optical fiber cutter of this invention.

Referring to FIG. 24, the blade-fixation seat 126 is also provided with a supporting platform 1272 at a location corresponding to that of the supporting rod 11934. The upper surface of the supporting platform 1272 is configured in steps to delay the pressing of fibers by the fiber-pressing part 11935, and to allow the fiber fixing part to first fix both sides on the fiber cutting point. The supporting platform 1272 is at a location corresponding to that of the vertical rod of the supporting rod 11934. In accordance with this invention, the number of the steps on the upper surface of the supporting platform 1272 is not particularly limited. In this embodiment, the supporting platform 1272 comprises a first step and a second step, which are connected by a transition slope. The first step is higher than the second step. In this embodiment, when the cutter cover body 11 is closed, the vertical rod of the supporting rod 11934 touches the first step of the supporting platform 1272 first, and the blade-fixation seat 126 slides backwards, causing the vertical rod to fall from the first step to the second step. After that, the fiber-pressing spring 11931 keeps on expanding, and the fiber-pressing rubber 11936 presses the fiber 5 and coordinates with the blade 13 to cuts the fiber 5.

In this embodiment, the fiber-fixing component comprises two first fiber fixed parts 11941, which are separately located at the two sides of the first circular hole on the pressure hammer body 1191 and fixed on the lower side of the pressure hammer body 1191. At corresponding locations, the upper side of the blade-fixation seat 126 is provided with two second fiber-fixing parts 11942. When the cutter cover body 11 is closed, the first fiber-fixing parts 11941 and the second fiber-fixing parts 11942 match up and clamp down on the fiber. In this embodiment, when the fiber is being cut, the fiber-pressing part 11935 is located between the two first fiber-fixing parts 11941 and the two second fiber-fixing parts 11942.

The lower side of each first fiber fixed part 11941 and the upper side of each second fiber fixed part 11942 are provided with rubber pads 11943 to prevent crashing the fiber.

The fiber-pressing part 11935 is located between the two first fiber-fixing parts 11941. When the cutter cover body 11 is opened, the fiber-pressing elastic body is not compressed. The fiber-pressing part 11935 protrudes out of the two first fiber-fixing parts 11941, and the lower end of the supporting rod 11934 protrudes out of the fiber-pressing part 11935.

When the cutter cover body 11 is closed, it presses on the fiber-pressing spring 11931 and the spring 11932. Then, the fiber-pressing spring 11931 and the spring 11932 are compressed, making the pressure hammer body 1191 and the fiber-pressing component move down together. At this moment, the supporting rod 11934 touches the first step of the supporting platform 1272 on the blade-fixation seat 126 first, and the fiber-pressing spring 11931 is compressed from the bottom, preventing the fiber-pressing part 11935 from touching the fiber 5 at this moment (i.e., the downward pressing movement of the fiber-pressing component pauses). Meanwhile, the fiber-fixing component keeps on pressing downward until the fiber-fixing part touches the fiber 5 and fixes the fiber 5 inplace. In other words, the fiber-fixing component fixes the both sides of the fiber cut point. The cutter cover body 11 keeps pressing downward, and the pin 112 on cutter cover body 11 touches the position-restricting pin 1262, making the blade-fixation seat 126 slides back. The backward movement of the blade-fixation seat 126 makes the supporting rod 11934 slide from the first step to the second step on the supporting platform 1272, i.e., from a high position to a low position. After that, the supporting rod 11934 no longer pushes the fiber-pressing spring 11931 from underneath, and the fiber-pressing part 11935 falls and pushes the fiber 5 from above. Finally, the blade 13 cuts the fiber 5 from underneath to finish the cutting.

Figure 25:
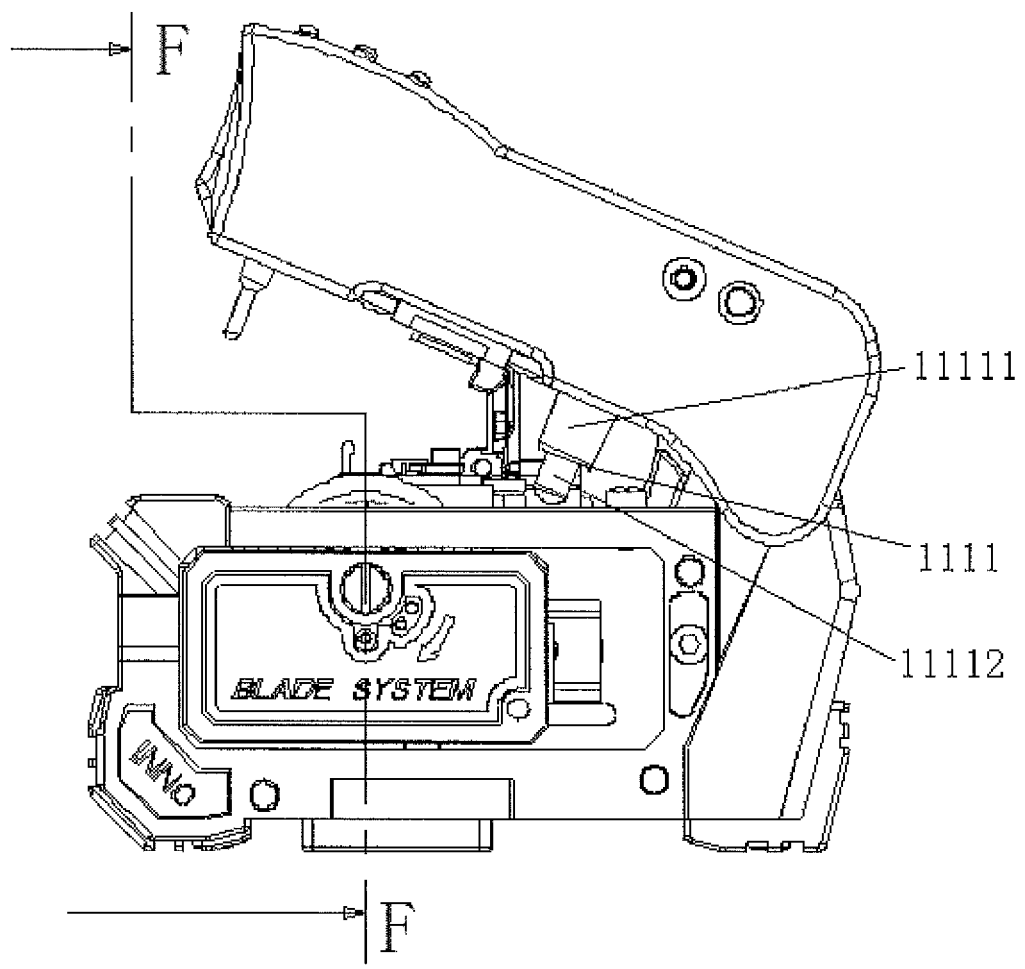
FIG. 25 shows a plan view 3 of a fully-automated optical fiber cutter of this invention in an open state.

Referring to FIG. 25, in this invention, the cutter cover body 11 springs back through a supporting part 1111, which comprises a large cylinder 11111 and a small cylinder 11112. The large cylinder 11111 is fixed on the inside of the cutter cover body 11, and the small cylinder 11112 is connected to the lower end of the large cylinder 11111 elastically. In this embodiment, the small cylinder 11112 is elastically connected to the lower end of the large cylinder 11111 via a spring, and the small cylinder 11112 can retract inside the large cylinder 11111. The lower end of the small cylinder 11112 abuts the cutting platform 127 of the cutter main body 12.

When the cutter cover body 11 is closed, it presses on the supporting part 1111, and the small cylinder 11112 retracts inside the large cylinder 11111. After cutting, the small cylinder 11112 stretches out because of the tension of the spring inside the supporting part 1111. Therefore, the cutter cover body 11 is pushed up, thereby the cutter cover body 11 opens.

Figure 26:
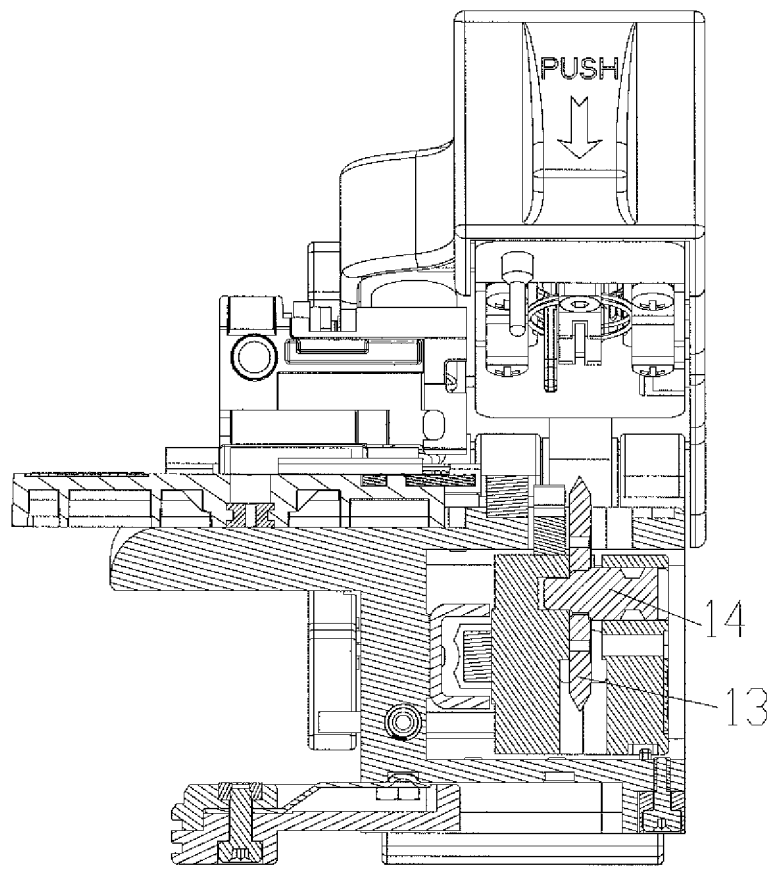
FIG. 26 shows a sectional view along F-F of a fully-automated optical fiber cutter of this invention.

Referring to FIGS. 25~26, when the fiber cutter leaves the factory, the manufacturer usually would adjust the height of the blade 13 and fix the blade 13 on the blade-fixation seat 126. The height of the blade 13 may need to be adjusted after many uses, because the knifepoint of the blade 13 may not reach the fiber after many uses or deviates from the best cutting height after a long time. In this embodiment, the blade 13 is disposed on the blade-fixation seat 126 via a height adjusting device that can adjust the height of the blade 13.

Figure 27A:
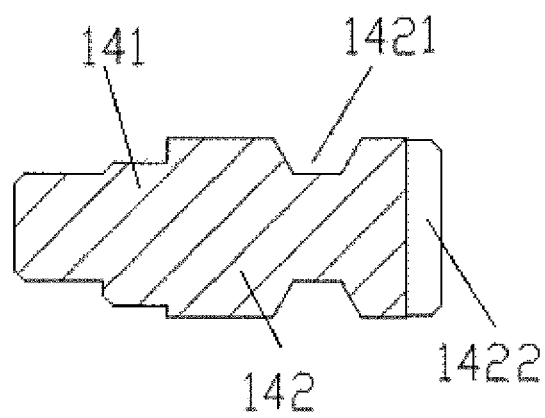
FIG. 27A shows a structure of a bent axle of a fully-automated optical fiber cutter of this invention.
Figure 27B:
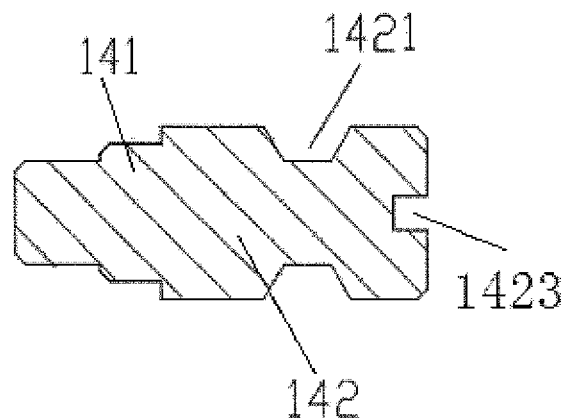
FIG. 27B shows a structure of another bent axle of a fully-automated optical fiber cutter of this invention.
Figure 28:
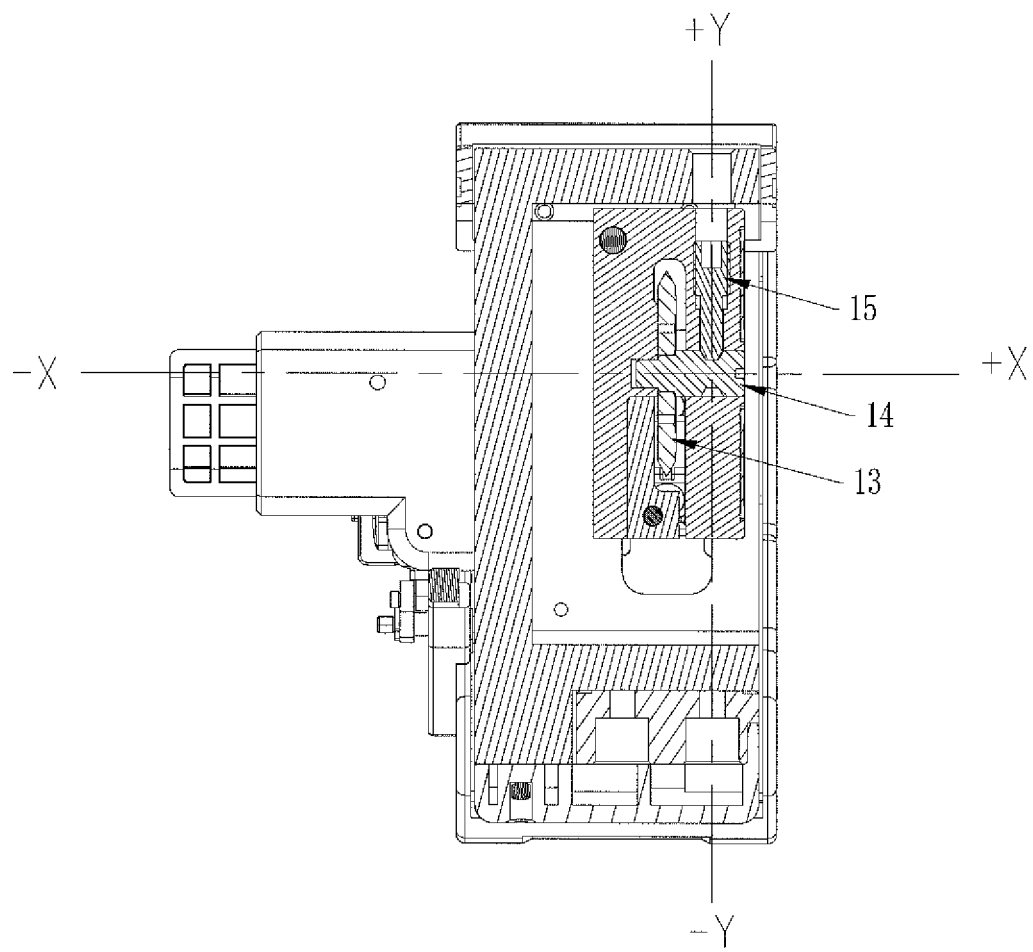
FIG. 28 shows a partial, sectional view of a bent axle on a blade-fixation seat of a fully-automated optical fiber cutter of this invention.

The height adjusting device comprises a bent axle 14, which is removably connected to the blade-fixation seat 126. The bent axle 14 is fixed to the blade 13. When the bent axle 14 is rotated, the blade 13 turns in an elliptical motion on the blade-fixation seat 126 so as to change the height of the blade 13. The structure in detail is given below:

Referring to FIG. 27A, 27B and FIG. 28, the blade 13 is provided with a round hole at the center. The bent axle 14 has a stepped cylindrical structure and comprises a connecting part 141 and a fixing part 142. The connecting part 141 and the fixing part 142 are both cylindrical. The connecting part 141 is fixed to the fixing part 142 in a non-coaxial manner. The connecting part 141 is fixedly inserted in the round hole of the blade 13. Because the connecting part 141 is not concentric with other part of the bent axle 14, when the bent axle 14 rotates, the connecting part 141, due to its off-center force, will drive the blade 13 to turn in an elliptical motion, resulting in adjusting the height of the blade 13 on the blade-fixation seat 126. The blade-fixation seat 126 is provided with a connecting hole on the outside. The connecting hole and the blade 13 are interlinked, and the fixing part 142 is installed in the connecting hole. The fixing part 142 is provided with at least one notch 1421 on the surface, and the blade-fixation seat 126 fixes the bent axle 14 by sticking a fixing element in the notch 1421. This connection manner can fix the bent axle 14 in the X direction and Y direction such that it would not deviate in either direction, thereby the blade 13 is firmly fixed to achieve great cutting effects. In this embodiment, the fixing element may be a position screw 15, and the connect section of the notch 1421 on the bent axle 14, for connecting with the position screw 15, may be designed in a wedge shape, which makes it easier to lock the end of the position screw 15.

In this embodiment, the tail of the fixing part 142 is visible on the blade-fixation seat 126. Referring to FIG. 27A, the tail of the fixing part 142 is provided with a protruded block 1422. To adjust the bent axle 14, the bent axle 14 can be rotated by rotating the protruded block 1422. For example, the protruding block 1422 may be clamped and rotated by using a plier. Referring to FIG. 27B, the tail of the fixing part 142 may be provided with a slot 1423. When adjusting the bent axle 14, a screwdriver may be inserted into the slot 1423 and rotated to rotate the bent axle 14. The the two structures of bent axle 14 are specific examples. However, embodiments of the invention are not limited to these two. Between the two embodiments, the better mode for adjustment is the mode shown in FIG. 27B.

Figure 29:
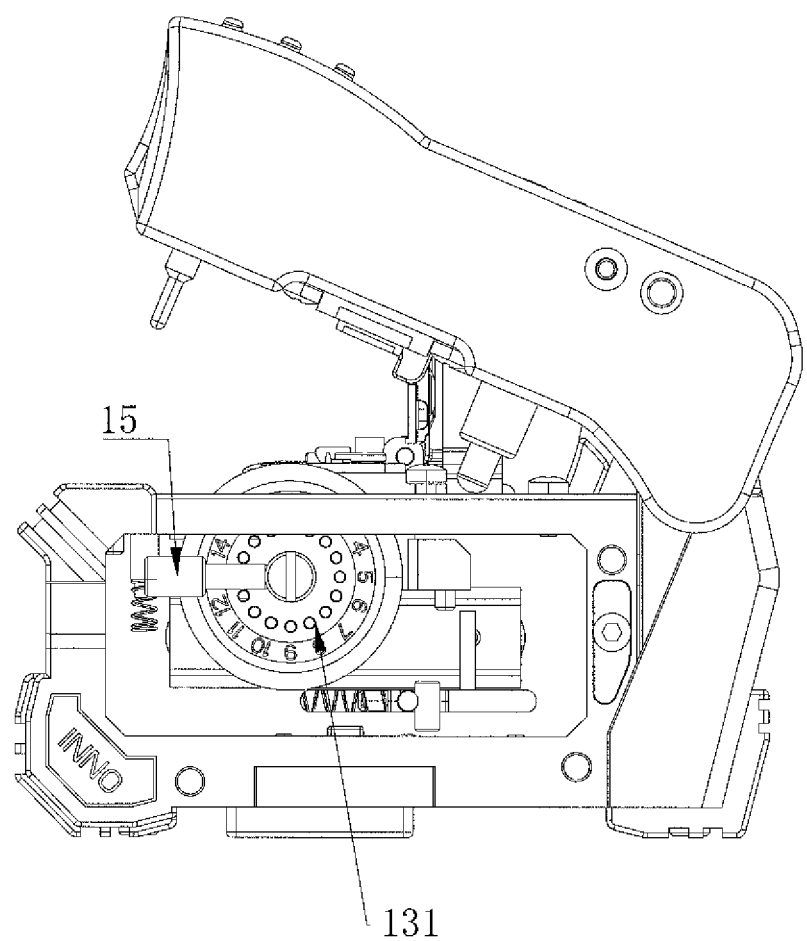
FIG. 29 shows view 1 illustrating angle adjustment of a blade in a fully-automated optical fiber cutter of this invention.
Figure 30:
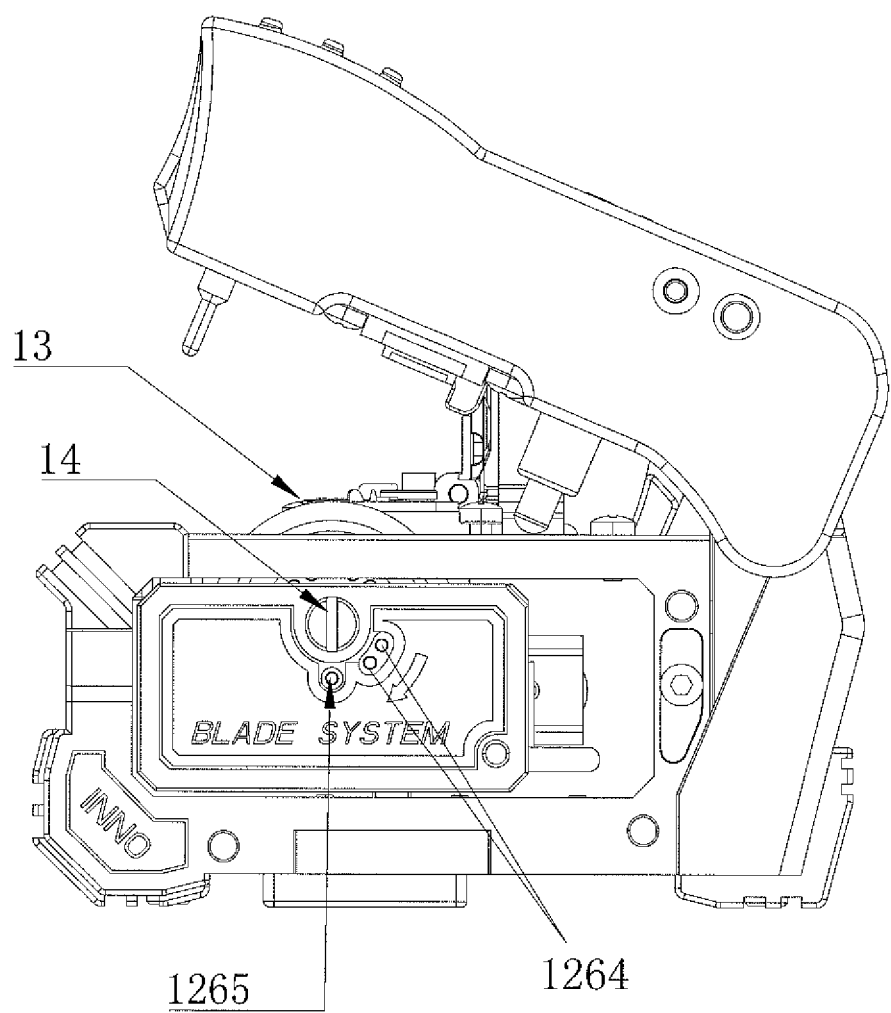
FIG. 30 shows view 2 illustrating angle adjustment of a blade in a fully-automated optical fiber cutter of this invention.

Referring to FIG. 29-30, in cutting every fiber, the blade 13 cuts fiber using the same spot every time. Therefore, there would be abrasions at the spot of the blade 13 after cutting optical fibers many times. Therefore, according to the embodiment, the angle of the blade 13 may be adjusted.

The blade 13 is provided with markings. The blade 13 is provided with several marking holes 131. The blade marking holes 131 correspond to the markings. The several blade marking holes 131 are arranged around outside of the center round hole of the blade 13. The blade-fixation seat 126 is provided with several blade marking adjusting holes 1264. A blade marking hole 131 may be connected with two blade marking adjusting holes 1264. The end face of the blade-fixing screw 1265 is flat, and the blade-fixing screw 1265 can be screwed into the blade 13 from outside of blade-fixation seat 126 to touch the surface of blade to fix the blade 13 such that the blade 13 cannot turn. To enhance the usage and life of blade 13, the angle of the blade 13 can be adjusted periodical such that different spots on the blade 13 are used to cut the fiber. When adjusting the angle of the blade 13, first loosen the blade-fixing screw 1265. Then, turn the blade 13 in the clockwise or counterclockwise direction using an aricular tool inserted from a blade marking adjusting holes 1264 into a blade marking hole 131.

The above only explains an embodiment of this invention. However, this invention is not limited to the above embodiment. Any changes or variations of the embodiments can be appreciated by one skilled in this field shall be within the scope of protection in this application.

What is claimed is:

1. A fully-automated optical fiber cutter, wherein said fully-automated optical fiber cutter comprises a fiber cutter body and a fiber clamp; said fiber cutter body comprises a cutter cover body and a cutter main body, and one end of said cutter main body is pivotally connected to said cutter cover body; said cutter main body is provided with a blade-fixation seat, which is provided with a blade for fiber cutting; said fiber clamp is installed on said cutter main body and comprises a clamp main body and a clamp cover body; said clamp main body is pivotally connected to said clamp cover body; said cutter cover body, said clamp cover body and said blade-fixation seat are linked by a linkage component; when the fiber cutter is not in use, said cutter cover body and clamp cover body are opened; when the fiber cutter is in use, said cutter cover body is closed by pressing, which drives said clamp cover body closed and pushes said blade-fixation seat to move, thereby said blade is aligned and cuts a fiber; after cutting, said cutter cover body springs back to open;

wherein said linkage component comprises a driving lever, which is fixed on a side face of said cutter cover body, said driving lever and said blade-fixation seat are linked;

wherein an inside of said cutter main body is provided with an accommodating groove, inside which said blade-fixation seat is movably installed; wherein an outside face of said cutter main body is provided with a first bar-shaped guide slot, inside which a first spring is installed; said first spring is elastically connected to a pushing lever; wherein a distal end of said pushing lever protrudes out of said first bar-shaped guide slot and is at a location corresponding to said driving lever; wherein said driving lever can push said pushing lever in said first bar-shaped guide slot; wherein a proximate end of said pushing lever is fixed to said blade-fixation seat.

2. The fully-automated optical fiber cutter of claim 1, wherein an upper side of said accommodating groove is connected with a platform hole; wherein said cutter cover body is provided with a pin at a location corresponding to that of the platform hole; when said cutter cover body is closed, said pin can be inserted into said platform hole; an upper side of said blade-fixation seat is provided with a blind via, and a second spring is installed on a lower side of the blind via; an upper end of said second spring is connected to a position-restricting pin; when said cutter cover body is opened, said driving lever pushes said pushing lever to move forward; when said pushing lever pushes said blade-fixation seat to move forward in the accommodating groove, said position-restricting pin moves forward until it is located below said platform hole, and then said second spring jacks up said position-restricting pin, then said position-restricting pin is inserted into said platform hole, thereby an opening movement of said cutter cover body is stopped; when said cutter cover body is closed, said pin is inserted into the platform hole, and presses said position-restricting pin separates from said platform hole from below; said pushing lever moves back, and said first spring pushes said pushing lever to move back, said pushing lever pushes said blade-fixation seat to move back until the fiber is cut.

3. The fully-automated optical fiber cutter of claim 1, wherein the end of said blade-fixation seat is provided with a cushion, and the material of said cushion is rubber.

4. The fully-automated optical fiber cutter of claim 1, wherein an inside face of said driving lever is provided with a notch, and an outside face of said cutter main body is movably provided with a lock catch at a location corresponding to a location of the notch; said lock catch can be inserted into said notch; the outside face of said cutter main body is provided with a second bar-shaped guide slot, inside which said lock catch is movably installed; on an inside face of said lock catch is provided with at least one concave, and the inside of said cutter main body is provided with a horizontal groove, which is connected with said second bar-shaped guide slot; the inside of said horizontal groove is provided with a third spring; an upper end of said third spring is connected to a locking member, which can be inserted into said at least one concave of the lock catch.

5. The fully automated optical fiber cutter of claim 1, wherein said linkage component is provided with a first connecting shaft and a second connecting shaft, said first connecting shaft and said second connecting shaft are both fixed on the cutter cover body; said first connecting shaft is provided with a connection strap which is fixedly connected, and said second connecting shaft is movably connected with a V-rotating plate; a first side of said V-rotating plate is connected to the connection strap, and a lower end of the second side of said V-rotating plate is provided with a protruding press lever; said clamp cover body is provided with a protruding block at a location corresponding to a location of the protruding press lever; said press lever is located at the inside of the protruding block; when said cutter cover body is closed, said press lever presses the clamp cover body to rotate inward, then the clamp cover body is closed; when said cutter cover body is opened, said press lever touches said protruding block and therefore said clamp cover body rotate outward, then said clamp cover body is opened.

6. The fully-automated optical fiber cutter of claim 1, wherein said linkage component further comprises a pressure hammer member, which is installed on the inside of said cutter cover body; said pressure hammer member comprises a pressure hammer body and a fiber-pressing component, and said pressure hammer body is movably connected to the inside of said cutter cover body; the middle part of said pressure hammer body has a first circular hole, in which said fiber-pressing component is movably installed; said fiber-pressing component is elastically connected to the cutter cover body; when said cutter cover body is closed, said pressure hammer body and fiber-pressing component are compressed, said pressure hammer body fixes two sides of the fiber cutting point, and said fiber-pressing component is at a location corresponding to a location of the blade; then said fiber-pressing component presses the fiber, and said blade cuts the fiber; after the fiber has been cut, said pressure hammer body and fiber-pressing component spring back, and said cutter cover body is opened.

7. The fully-automated optical fiber cutter of claim 6, wherein an end of said pressure hammer body is pivotally connected to a shaft of said cutter cover body; a gap is present between said pressure hammer body and the inside face of said cutter cover body, and said pressure hammer body is elastically connected to the inside face of said cutter cover body; the end of said pressure hammer body is hooked to said cutter cover body through a hooking board.

8. The fully-automated optical fiber cutter of claim 7, wherein inside the first circular hole of said pressure hammer body is provided with a pressure hammer sleeve; and an upper end of said pressure hammer sleeve is provided with a hooking border, which is located above said pressure hammer body; said hooking border is sleeved in a spring, an upper end of which is connected to the inside of said cutter cover body; a middle part of said pressure hammer sleeve is provided with a second circular hole, inside Which the fiber-pressing component is movably installed.

9. The fully-automated optical fiber cutter of claim 8, wherein said fiber-pressing component comprises a fiber-pressing elastic body, a fiber-pressing slide block and a fiber-pressing part, and said fiber-pressing slide block is installed in the second circular hole of said pressure hammer sleeve; said fiber-pressing slide block is elastically connected to the inside of said cutter cover body through said fiber-pressing elastic body, and said fiber-pressing part is located on the bottom of said fiber-pressing slide block; when said cutter cover body is closed, said fiber-pressing part faces the blade.

10. The fully-automated optical fiber cutter of claim 9, wherein the bottom of said fiber-pressing part is provided with a fiber-pressing rubber.

11. The fully-automated optical fiber cutter of claim 10, wherein said fiber-pressing elastic body is a fiber-pressing spring, correspondingly, a slot hole is installed inside the upper end of said fiber-pressing slide block; and the upper end of the fiber-pressing slide block is provided with a hurdle border, which is outward convex; said fiber-pressing spring is installed in said slot hole, and is connected to said cutter cover body.

12. The fully-automated optical fiber cutter of claim 9, wherein said fiber-pressing component further comprises a supporting rod, which is L shaped; the horizontal rod of said supporting rod is fixed on the bottom of the fiber-pressing slide block and the vertical rod of said supporting rod is fixed on one side of the fiber-pressing slide block; said fiber-pressing part is located inside the supporting rod and is fixed on the horizontal rod of the supporting rod.

13. The fully-automated optical fiber cutter of claim 12, wherein said blade-fixation seat is further provided with a supporting platform, which faces the vertical rod of said supporting rod; when said cutter cover body is closed, the vertical rod of said supporting rod touches the supporting platform firstly, and said fiber-pressing spring keeps on compressing until said fiber-pressing rubber presses the fiber on the blade to cut the fiber.

14. The fully-automated optical fiber cutter of claim 13, wherein an upper surface of said supporting platform is shaped in steps.

15. The fully-automated optical fiber cutter of claim 6, wherein said pressure hammer member further comprises a fiber-fixing component, which comprises two first fiber-fixing parts; said two first fiber-fixing parts are separately located on two sides of the first circular hole of said pressure hammer body and are fixed on the lower end of said pressure hammer body; at a corresponding location on an upper side of the blade-fixation seat is provided with two second fiber-fixing parts; when the cutter cover body is closed, said first fiber-fixing parts cooperates with said second fiber-fixing parts to clamp the fiber.

16. The fully-automated optical fiber cutter of claim 8, wherein a lower end of the first fiber-fixing part and an upper end of the second fiber-fixing part are provided with rubber pads.

17. The fully-automated optical fiber cutter of claim 11, wherein said fiber-pressing part is located between the two first fiber-fixing parts; when said cutter cover body is opened, said fiber-pressing elastic body is not compressed; the fiber-pressing part protrudes out of the two first fiber-fixing parts, and the lower end of the supporting rod protrudes out of the fiber-pressing part.

18. The fully-automated optical fiber cutter of claim 1, wherein it further comprises a collector, which is detachably connected to said fiber cutter body; said collector comprises a collector body and a collector cover body, and said collector cover body is pivotally connected to said collector body; said blade-fixation seat is connected to the collector cover body via an elevator mechanism to open or close said collector cover body.

19. The fully-automated optical fiber cutter of claim 18, wherein said blade-fixation seat is provided with a first linkage lever that is fixedly connected; said collector cover body is protrudingly provided with a pinna; and the outside of said collector body is provided with the elevator mechanism, the elevator mechanism is located at a position corresponding to a position of the pinna; said elevator mechanism is movably connected to said first linkage lever; when said cutter cover body is opened, said driving lever drives the pushing lever, and the pushing lever drives the blade-fixation seat moving; the moving of the blade-fixation seat makes the first linkage lever moving, and the first linkage lever drives the elevator mechanism to rise, thereby the elevator mechanism touches the pinna of the collector cover body and makes the collector cover body opened.

20. The fully-automated optical fiber cutter of claim 19, Wherein said elevator mechanism comprises an elevator block and an elevator lever; said elevator lever is connected to an upper end of the elevator block; said elevator block is provided with a sliding groove, in which said first linkage lever can slide horizontally; one of the wall of the sliding groove is provided with a slope.

21. The fully-automated optical fiber cutter of claim 20, wherein said cutter cover body is further provided with a second linkage lever; said collector cover body is provided with an upper fiber-spool shaft, and said collector body is provided with a lower fiber-spool shaft which is at a position corresponding to a position of said upper fiber-spool shaft; said upper fiber-spool shaft and lower fiber-spool shaft are both rotationally installed on the open end of said collector; said lower fiber-spool shaft is connected to a transmission component, which is connected to said second linkage lever; when said cutter cover body is opened, it drives said second linkage lever moving, which drives said transmission component moving; said transmission component drives said lower fiber-spool shaft rotating; said lower fiber-spool shaft drives said upper fiber-spool shaft to spool fiber.

22. The fully-automated optical fiber cutter of claim 21, wherein said transmission component comprises a turning block, a ratchet component, and a gear component; said turning block is fixedly connected to the second linkage lever; said ratchet component comprises a ratchet wheel and a ratchet shaft, and said ratchet wheel is sleeved on the ratchet shaft, around which the ratchet wheel can rotate in a single direction; said ratchet shaft is fixedly connected to said turning block; said gear component comprises a small gear wheel, a worm wheel, and a fiber-spool gear, and said small gear wheel is coaxially connected to said worm wheel; said small gear wheel meshes and transmits the ratchet wheel in a single direction, and the worm wheel meshes with the fiber-spool gear; said fiber-spool gear is coaxially connected to said lower fiber-spool shaft.

23. The fully-automated optical fiber cutter of claim 1, wherein said blade is installed on said blade-fixation seat using a height-adjusting device, and said height-adjusting device can adjust the height of the blade.

24. The fully-automated optical fiber cutter of claim 23, wherein said height-adjusting device comprises a bent axle, which is removably installed on said blade-fixation seat; said bent axle is fixedly connected to said blade; when said bent axle is turned, said blade rotates on said blade-fixation seat in an elliptical motion so as to change a height of said blade.

25. The fully-automated optical fiber cutter of claim 24, wherein said blade is provided with a round hole in the middle part; said bent axle is designed as a step-shaped cylindrical structure and comprises a connecting part and a fixed part; said connecting part is fixedly connected to said fixed part in a non-coaxial manner, and said connecting part is sleeved in the round hole; when said bent axle is rotated, said connecting part drives the blade turning in an elliptical motion so as to change the height of said blade on the blade-fixation seat.

26. The fully-automated optical fiber cutter of claim 25, wherein an outside of said blade-fixation seat is provided with a connecting hole, which is connected with said blade, and said fixed part is installed in said connecting hole.

27. The fully-automated optical fiber cutter of claim 25, wherein said fixed part is provided with at least one notch on the surface, and the blade-fixation seat fixes the bent axle by sticking a fixing in the notch.

28. The fully-automated optical fiber cutter of claim 25, wherein said blade-fixation seat is provided with blade adjusting marking holes, and said blade is provided with some blade marking holes, which are located outside the round hole of said blade; said blade marking hole is connected with said blade adjusting marking holes; said blade is provided with marking, which corresponds to said blade marking holes.

29. The fully-automated optical fiber cutter of claim 18, wherein a side face of said cutter main body is provided with location holes, correspondingly, the side face of said collector is provided with positioning protrusions; said positioning protrusions can insert into the location holes; said cutter main body is also provided with a magnetizer and said collector is provides with a magnetic body correspondingly; said magnetizer and said magnetic body can attract together.

30. The fully-automated optical fiber cutter of claim 1, wherein the bottom of said cutter main body is provided with an adjustable foot pad and a bottomless accommodating groove; said adjustable foot pad is movably connected to an inside of said bottomless accommodating groove; said adjustable foot pad comprises a foot pad supporter and a foot pad position-restricting part, and said foot pad supporter is installed below said foot pad position-restricting part.

* * * * *